United States Patent
Rosenthal et al.

(10) Patent No.: US 11,722,347 B2
(45) Date of Patent: Aug. 8, 2023

(54) BACKSCATTER DEVICES AND SYSTEMS HAVING DIGITAL ARCHITECTURES FOR OFDM BACKSCATTER

(71) Applicant: University of Washington, Seattle, WA (US)

(72) Inventors: James D. Rosenthal, Seattle, WA (US); Matthew S. Reynolds, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 17/576,707

(22) Filed: Jan. 14, 2022

(65) Prior Publication Data
US 2022/0224583 A1 Jul. 14, 2022

Related U.S. Application Data

(60) Provisional application No. 63/137,527, filed on Jan. 14, 2021.

(51) Int. Cl.
*H04L 27/26* (2006.01)
*H04L 27/00* (2006.01)
*H04L 27/02* (2006.01)
*H04L 5/00* (2006.01)

(52) U.S. Cl.
CPC ...... *H04L 27/26265* (2021.01); *H04L 5/0007* (2013.01); *H04L 27/0008* (2013.01); *H04L 27/02* (2013.01)

(58) Field of Classification Search
CPC .................. H04L 27/2627; H04L 27/2628
See application file for complete search history.

(56) References Cited

U.S. PATENT DOCUMENTS

| 5,784,686 | A | 7/1998 | Wu et al. |
|---|---|---|---|
| 9,680,520 | B2 | 6/2017 | Gollakota |
| 9,973,367 | B2 | 5/2018 | Gollakota |
| 10,033,424 | B2 | 7/2018 | Gollakota |
| 10,079,616 | B2 | 9/2018 | Reynolds et al. |
| 10,270,639 | B2 | 4/2019 | Gollakota |
| 10,382,161 | B2 | 8/2019 | Gollakota |
| 10,447,331 | B2 | 10/2019 | Gollakota |

(Continued)

FOREIGN PATENT DOCUMENTS

| WO | WO-2014191693 A1 | * | 12/2014 | ......... H04L 27/2602 |
|---|---|---|---|---|
| WO | WO-2017176772 A1 | * | 10/2017 | ......... H04L 25/0278 |

(Continued)

OTHER PUBLICATIONS

"Digital Tunable Capacitors (DTCs)—pSemi—Key Features", https://www.psemi.com/products/family/digital-tunable-capacitors-dtcs. Retrieved Jul. 20, 2020, pp. 1-6.

(Continued)

*Primary Examiner* — Kevin Kim
(74) *Attorney, Agent, or Firm* — Stoel Rives LLP

(57) ABSTRACT

Examples of digital architectures for OFDM backscatter communication are described herein that use RF switches and discrete loads to implement digitally controlled single-sideband OFDM backscatter devices. One or more transforms may be implemented, including one or more IFFTs, LUTs, and/or numerically-controlled oscillators using one or more sine LUTs.

20 Claims, 10 Drawing Sheets

(56) References Cited

U.S. PATENT DOCUMENTS

| | | | |
|---|---|---|---|
| 10,587,445 | B2 | 3/2020 | Gollakota |
| 10,652,073 | B2 | 5/2020 | Talla et al. |
| 10,693,521 | B2 | 6/2020 | Reynolds |
| 10,812,130 | B2 | 10/2020 | Talla |
| 10,873,363 | B2 | 12/2020 | Gollakota |
| 10,951,446 | B2 | 3/2021 | Kellogg et al. |
| 11,212,479 | B2 | 12/2021 | Gollakota |
| 11,477,597 | B2 | 8/2022 | Reynolds et al. |
| 2008/0225932 | A1 | 9/2008 | Fukuda |
| 2011/0260839 | A1 | 10/2011 | Cook et al. |
| 2012/0112885 | A1 | 5/2012 | Drucker |
| 2015/0311944 | A1 | 10/2015 | Gollakota |
| 2016/0365890 | A1 | 12/2016 | Reynolds et al. |
| 2017/0180075 | A1 | 6/2017 | Gollakota |
| 2017/0180178 | A1 | 6/2017 | Gollakota |
| 2017/0331509 | A1 | 11/2017 | Gollakota |
| 2018/0241604 | A1 | 8/2018 | Gollakota |
| 2018/0358996 | A1 | 12/2018 | Gollakota |
| 2018/0375703 | A1 | 12/2018 | Kellogg et al. |
| 2019/0116078 | A1 | 4/2019 | Gollakota |
| 2019/0158341 | A1 | 5/2019 | Talla |
| 2019/0207642 | A1 | 7/2019 | Reynolds |
| 2020/0052734 | A1 | 2/2020 | Talla |
| 2020/0212956 | A1 | 7/2020 | Gollakota |
| 2021/0084251 | A1 | 3/2021 | Gollakota |
| 2021/0099198 | A1 | 4/2021 | Reynolds |

FOREIGN PATENT DOCUMENTS

| | | | | |
|---|---|---|---|---|
| WO | WO-2019023283 | A1 * | 1/2019 | ........... H04B 7/0456 |
| WO | WO-2020125959 | A1 * | 6/2020 | ............... H04B 1/40 |

OTHER PUBLICATIONS

"EPC Compliant Class-1 Generation-2 UHF RFID Devices Conformance Requirements", GS1 AISBL Release 2.0.1 Ratified,, Oct. 2015, pp. 1-96.

"iCE40 LP/HX—Low-power, high-performance FPGA", https://www.latticesemi.com/Products/FPGAandCPLD/iCE40, Retrieved Jul. 20, 2020, pp. 1-7.

"MachXO: Versatile and non-volatile PLD for bridging, infinitely reconfigurable I/O expansion.", https://www.latticesemi.com/Products/FPGAandCPLD/MachXO, Retrieved Jul. 20, 2020, pp. 1-5.

"NCO IP Core User Guide", Altera Corporation, Dec. 15, 2014, pp. 7-34.

"TinyFPGA", https://tinyfpga.com/, Retrieved on Jul. 20, 2020, pp. 1-3.

"Wideband 2.5 GHz, 37 dB Isolation at 1 GHz, CMOS 1.65 V to 2.75 V, 4:1 Mux/SP4T", Analog Devices, Inc. https://www.analog.com/media/en/technical-documentation/datasheets/, Retrieved Jul. 20, 2020, pp. 1-16.

Correia, Ricardo , et al., "OFDM-like High Order Backscatter Modulation", 2018 IEEE MTT-S International Microwave Workshop Series on 5G Hardware and System Technologies (IMWS-5G) doi: 10.1109/IMWS-5G.2018.8484348, 2018, pp. 1-3.

Dadkhah, Anissa , et al., "ZeroScatter: Zero-Added-Component Backscatter Communication using Existing Digital I/O Pins", 2019 IEEE Topical Conference on Wireless Sensors and Sensor Networks (WiSNet), Jan. 2019, pp. 1-3.

Ensworth, Joshua F., et al., "Every Smart Phone is a Backscatter Reader: Modulated Backscatter Compatibility with Bluetooth 4.0 Low Energy (BLE) Devices", 2015 IEEE International Conference on RFID (RFID), Apr. 2015, pp. 78-85.

Ghiwala, Gopal D., et al., "Realization of FPGA based numerically Controlled Oscillator", IOSR Journal of VLSI and Signal Processing vol. 1, Issue 5, Feb. 2013, pp. 7-11.

Griffin, Joshua D,, et al., "Complete Link Budgets for Backscatter-Radio and RFID Systems", IEEE Antennas and Propagation Magazine, vol. 51, No. 2,, Apr. 2009, pp. 11-25.

Kimionis, John , et al., "Increased Range Bistatic Scatter Radio", IEEE Transactions on Communications, vol. 62, No. 3, Mar. 2014, pp. 1091-1104.

Kimionis, John , et al., "Pulse Shaping: The Missing Piece of Backscatter Radio and RFID", IEEE Transactions on Microwave Theory and Techniques, vol. 64, No. 12, Dec. 2016, pp. 4774-4788.

Muller, Rikky , et al., "A Minimally Invasive 64-Channel Wireless μECoG Implant", IEEE Journal of Solid-State Circuits, vol. 50, No. 1, Jan. 2015, pp. 1-16.

Ranganathan, Vaishnavi, et al., "RF Bandaid: A Fully-Analog and Passive Wireless Interface for Wearable Sensors", Proc. ACM Interact. Mob Wearable Ubiquitous Technol., vol. 2, No. 2, Article 79, Jun. 2018, pp. 1-21.

Reynolds, Matthew S., "A 2.4-GHz, Hybrid 10-Mb/s BPSK Backscatter and 1-Mb/s FSK Bluetooth TX With Hardware Reuse", IEEE Microwave and Wireless Components Letters, vol. 27, No. 12, Dec. 2017, pp. 1155-1157.

Rosenthal, James , et al., "A 1.0-Mb/s 198-pJ/bit Bluetooth Low-Energy Compatible Single Sideband Backscatter Uplink for the NeuroDisc Brain-Computer Interface", IEEE Transactions on Microwave Theory and Techniques, vol. 67, No. 10, Oct. 2019, pp. 4015-4022.

Rosenthal, James , et al., "A 25 Mbps, 12.4 pJ/b DQPSK Backscatter Data Uplink for the NeuroDisc Brain-Computer Interface", IEEE Transactions on Biomedical Circuits and Systems, vol. 13, No. 5, Oct. 2019, pp. 858-867.

Rosenthal, James , et al., "All-Digital Single Sideband (SSB) Bluetooth Low Energy (BLE) Backscatter with an Inductor-free, Digitally-Tuned Capacitance Modulator", 2020 IEEE/MTT-S International Microwave Symposium (IMS) DOI:10.1109/IMS30576.2020.9223953, Aug. 2020, pp. 1-4.

Tang, A., et al., "A 5.8 GHz 1.77mW AFSK-OFDM CMOS Backscatter Transmitter for Low Power IoT Applications", 2018 IEEE/MTT-S International Microwave Symposium—IMS, Jun. 2018, pp. 259-261.

Thomas, Stewart J., et al., "A 96 Mbit/sec, 15.5 pJ/bit 16-QAM Modulator for UHF Backscatter Communication", IEEE International Conference on RFID, Apr. 2012, pp. 185-190.

Thomas, Stewart J., et al., "A Battery-Free Multichannel Digital Neural/EMG Telemetry System for Flying Insects", IEEE Transactions on Biomedical Circuits and Systems, vol. 6, No. 5,, Oct. 2012, pp. 424-436.

Wang, Linkai, et al., "Generic Mixed-Radix FFT Pruning", IEEE Signal Processing Letters, vol. 19, No. 3, Mar. 2012, pp. 167-170.

Zhang, Qiwei, et al., "An Efficient FFT for OFDM Based Cognitive Radio on a Reconfigurable Architecture", IEEE International Conference on Communications doi: 10.1109/ICC.2007.1079., 2007, pp. 6522-6526.

Kellogg, Bryce , et al., "Wi-Fi Backscatter: Internet Connectivity for RF-Powered Devices", DOI: 10.1145/2619239.2626319; ISBN: 978-1-4503-2836-4, Aug. 2014, pp. 607-618.

* cited by examiner

For 1-bit IFFT OFDM, $f_{samp}$ = 10 MHz, for DSM OFDM, $f_{samp}$ = 40 MHz

BACKSCATTER DEVICES AND SYSTEMS HAVING DIGITAL ARCHITECTURES FOR OFDM BACKSCATTER

CROSS-REFERENCE TO RELATED APPLICATIONS

This application claims the benefit under 35 U.S.C. § 119 of the earlier filing date of U.S. Provisional Application Ser. No. 63/137,527 filed Jan. 14, 2021, the entire contents of which are hereby incorporated by reference in their entirety for any purpose.

STATEMENT REGARDING RESEARCH & DEVELOPMENT

This invention was made with government support under Grant No. DGE-1762114, awarded by the NSF Graduate Research Fellowship Program. The government has certain rights in the invention.

TECHNICAL FIELD

Examples described herein relate generally to backscatter devices, systems, and techniques. Examples of backscatter devices having digital architectures for OFDM backscatter are described, which may include the use of one or more look-up tables (LUT) or numerically-controlled oscillators (NCO).

BACKGROUND

Wireless communication devices generally transmit information by generating a radiofrequency carrier using a circuit such as an oscillator, and modulating information onto the carrier wave using amplitude modulation, frequency modulation, phase modulation, quadrature amplitude modulation (QAM) or other techniques including a combination of the aforementioned modulation types. Multiple such modulated signals may be combined to form more complex schemes such as orthogonal frequency division multiplexing (OFDM). The carrier is usually a sinusoidal voltage at a radio frequency; that is a frequency at which energy may be propagated in the form of an electromagnetic wave by connecting the sinusoidal voltage to an antenna. The modulation process modifies the amplitude, frequency, and/or phase of the carrier in a time varying manner to convey information. Examples of conventional wireless communication devices include analog communication systems such as analog AM and FM broadcast radio as well as digital communication systems such as the widely used Wi-Fi (e.g. IEEE 802.11) and Bluetooth data communication standards as well as digital television (e.g. DTV) and digital broadcast radio standards.

Generally, conventional wireless communication devices have radiofrequency carrier generation and the modulation processes carried out in a single device or installation of interconnected devices.

In contrast, backscatter devices generally refer to an alternative communication method where carrier generation and modulation are performed in separate devices. For example, a carrier frequency may be generated in a first device that emits an electromagnetic carrier wave. A second device carries out the modulation process by scattering or reflecting the carrier wave, thus affecting the amplitude, frequency, and/or phase of the carrier emitted by the first device. This can be achieved by modulated scattering; that is by selective reflection of the incident carrier wave by means of a modulator circuit. Backscatter devices, requiring a modulator which may be a simple as a transistor, may be quite simple and low power.

Orthogonal frequency division multiplexing (OFDM) backscatter communication promises to enable ultra-low power wireless devices that are robust to time-varying multipath channels. Traditional OFDM transmitters require the use of power-hungry digital-to-analog converters (DACs) and vector modulators to realize the OFDM signal, adding to the complexity and power consumption of wireless sensor nodes.

BRIEF DESCRIPTION OF THE DRAWINGS

FIG. 4A is a real portion of an output of IFFT 306 with 16 bit resolution. FIG. 4B is a simulation of the 16-bit resolution signal of FIG. 4A, the real portion of the output of IFFT 306, truncated to the most significant bit. FIG. 4C is an imaginary portion of the output of IFFT 306 with 16 bit resolution. FIG. 4D is a simulation of the 16-bit resolution signal of FIG. 4C, the imaginary portion of the output of IFFT 306, truncated to the most significant bit. FIG. 4E is a Fourier transform of the complex output of IFFT 306.

FIG. 9A was simulated using two real-valued reflective impedances that are absorptive and reflective. FIG. 9B was simulated using two real-valued reflective impedances that are 180 degrees out of phase. FIG. 9C was simulated using four complex-valued reflective impedances that are 90 degrees out of phase, providing single sideband modulation. FIG. 9D was simulated using sixteen complex-valued reflective impedances. FIG. 9A-9B may be implemented using a two-throw switch. FIG. 9C may be implemented using a four-throw switch. FIG. 9D may be implemented using a sixteen throw switch.

DETAILED DESCRIPTION

Figure 1:
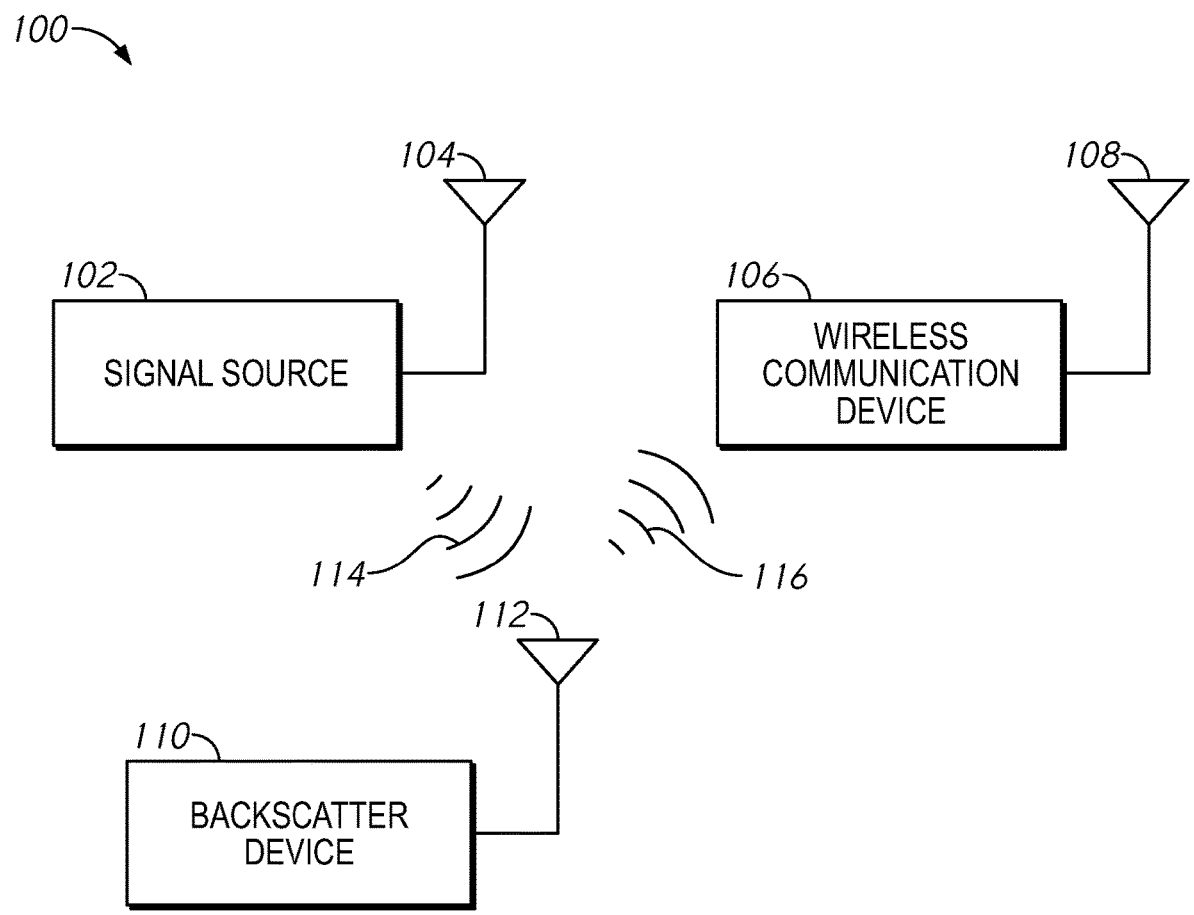
FIG. 1 is a schematic illustration of an example system 100 arranged in accordance with examples described herein.

Examples of digital architectures for OFDM backscatter communication are described herein that use RF switches and discrete loads to implement digitally controlled single-sideband OFDM backscatter devices. The digital architectures described herein may generally utilize all, or primarily, digital components to vary impedance at an antenna used to backscatter an incident signal. Design analysis is provided including simulations and measurements for a selected implementation using five subcarriers having binary phase shift keying (BPSK) modulation at a symbol rate of 250 kSymbols/s, and a throughput of 1.25 Mbit/s with a modulator energy consumption of 160 pJ/bit. A five-subcarrier over-the-air validation with 195 kbps throughput is also described. The number of RF switch states and the choice of impedances are shown to impact the metrics of subcarrier interference ratio and sideband suppression ratio, and reduced-numeric-precision Inverse Fast Fourier Transform (IFFT) structures are shown to impact the theoretical bit-error rate. The all-digital architectures and analysis presented herein may provide new avenues of low-cost, digital OFDM and multiple-access backscatter communication systems for use in challenging multipath environments.

The potential for energy efficiency offered by backscatter communication has resulted in numerous practical applications, primarily with different single-carrier modulation schemes. By selecting the specific modulator impedances and the sequence in which they are presented to the antenna, analog modulation and digital modulation schemes such as amplitude-shift keying, phase-shift keying, frequency shift keying, quadrature phase-shift keying, and 16 quadrature-amplitude modulation with data rates as high as 96 Mbits/s and up may be possible.

One drawback of single-carrier modulation is decreased reliability in channels with time varying multipath. Conventional active radio standards, such as IEEE 802.11 WLAN, have used multi-carrier orthogonal frequency division multiplexing (OFDM) to overcome these channel impairments. Traditionally, OFDM is implemented using the real and imaginary outputs of an inverse Fast Fourier Transform (IFFT) to control two voltage digital-to-analog converters (DACs) which in turn drive a vector modulator. This implementation is relatively power hungry due to the need to run the DACs at a sampling rate sufficient to Nyquist sample the entire OFDM signal bandwidth. Examples of backscatter devices described herein may not need to use DACs at the sampling rate required to sample the OFDM signal bandwidth. Instead, examples described herein may utilize one or more transforms, look-up tables, and/or numerically-controlled oscillators.

Certain details are set forth herein to provide an understanding of described embodiments of technology. However, other examples may be practiced without these particular details. In some instances, well-known circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

FIG. 1 is a schematic illustration of an example system 100 arranged in accordance with examples described herein. The system may include a signal source 102, which may provide a carrier signal 114 using antenna 104. The system 100 may include a backscatter device 110 which may receive the carrier signal 114 using the antenna 112 and modulate a backscattered version of the carrier signal 114 to provide a backscatter signal 116 using the antenna 112. The system may further include a wireless communication device 106 that may receive the backscatter signal 116 using antenna 108. The backscatter signal 116 may be constructed in accordance with established wireless communication protocols, such that the wireless communication device 106 may receive and decode the backscatter signal 116 without a need for custom programming (firmware, software) or hardware specific to communication with the backscatter device 110.

The signal source 102 may generally be any device that is capable of transmitting a suitable carrier signal 114 for backscatter by the backscatter device 110. Generally, the carrier signal 114 may be a radio frequency signal, such as a wireless communication signal and/or may be a single tone signal. The carrier signal 114 may have a carrier frequency (e.g. a frequency of a carrier wave that may be modulated with an input signal to provide data in the backscatter signal 116). The carrier signal 114 may generally be implemented using any signals which may be backscattered by backscatter devices described herein. The carrier signal 114 may be implemented using an RF signal including a wireless communication signal.

Examples of signals used to implement the carrier signal 114 include, but are not limited to, television transmission signals, radio transmission signals, cellular communication signals, Wi-Fi signals, and single tone signals. Devices which may be used to implement the signal source 102 include but are not limited to television transmitters, base stations including cellular base stations, AM or FM broadcast stations, digital radio stations, radar, Wi-Fi (e.g. IEEE 802.11) access points, Bluetooth devices, mobile devices, telephones (including cellular telephones), computers, routers, appliances, transceivers, tablets, watches, and/or transmitters. It should be understood that any externally (e.g. external to the backscatter device 110) generated carrier having at least one frequency component in the frequency range of interest (sometimes referred to as $F_{carrier}$) may be employed. In some examples, the signal source 102 may supply at least a portion of the operating power for the backscatter device 110.

The carrier signal 114 may be present in the environment from signal sources already present in an environment, and/or the carrier signal 114 may be provided by a signal source placed in an environment for the purpose of providing a signal to the backscatter device 110. While shown as having one antenna 104 the signal source 102 may be implemented having any number of antennas, including a phased array antenna, or a multiple-input-multiple-output (MIMO) array of antennas.

The signal source 102 may include a frequency source, such as an oscillator or frequency synthesizer, which may supply radio frequency energy to the signal source 102, in some examples via a power amplifier included in the signal source 102. The frequency source may include one or more of a fixed frequency source, a frequency hopping source, or a direct sequence spread spectrum source. It may be powered by batteries, by an AC power source, and/or by energy harvested from its environment (such as via a solar cell or a thermal or vibrational energy harvester). The signal source 102 (e.g. a transmitter) may be fixed in location or it may be mobile, as in a handheld or vehicle mounted application.

In some examples the signal source 102 may include and/or be co-located with a receiver connected to the same antenna 104 or antenna array. In some examples the signal source 102 may be implemented using an RFID reader.

The backscatter device 110 may be implemented, for example, using a tag. In some examples, the backscatter device 110 may be implemented using a device for which low power communication is desirable, such as a tag, sensor node, or the like. Tags implementing the backscatter device 110 may be associated with (e.g. placed on and/or proximate to) any of a variety of items to provide information about the items. Such items include, but are not limited to, appliances, food storage containers, inventory items such as personal electronics, and portions of a building. While shown as having one antenna 112, the backscatter device 110 may utilize any number of antennas in some examples.

The backscatter device 110 may modulate a backscattered version of the antenna 112 from the signal source 102 to provide a backscatter signal 116 encoded with data to the wireless communication device 106. The backscatter signal 116 may be formatted in accordance with predetermined wireless communication standards, such as but not limited to OFDM signals. There are many different wireless communication standards, each of which may have a specified frequency plan, modulation scheme, and packet data format, among other specified parameters. Data encoded in the backscatter signal 116 by the backscatter device 110 may, for example, be related to data received from a sensor or an input, or may be related to an identity or parameter of an item with which the backscatter device 110 is associated (e.g. temperature in a portion of a building, identity of an inventory item, temperature of a food storage container).

Backscatter communication generally includes modulating the reflection of an incident signal at an antenna, rather than generating the signal itself. The carrier signal 114 used by the backscatter device 110 may include a signal having a carrier frequency that is provided by the signal source 102 for a dedicated purpose and/or for another purpose, such as a television broadcast or cellular communication between a base station and a mobile device. In some examples, the backscatter signal 116 may be encoded with data using a modulation scheme. To generate the backscattered signal, the backscatter device 110 may modulate the impedance of one or more antennas, such as the antenna 112, to alternate between two or more discrete states, e.g., including in some embodiments reflecting and not-reflecting. The reflecting state of the antenna 112 may provide a reflection of the carrier signal 114, and the non-reflecting state may not reflect the carrier signal 114. Thus, the backscatter device 110 may indicate either a '0' or a '1' bit by switching the state of the antenna 112 between the reflecting and non-reflecting states and/or generally by connecting difference impedances to and from the antenna 112.

Switching the state of the antenna 112 of the backscatter device 110 may include adjusting an impedance of a load coupled to the antenna 112. The magnitude and/or phase of the scattered signal from the antenna 112 is typically determined by the difference in the impedance values of the load coupled to the antenna 112. By modulating the electrical impedance presented to the antenna 112, the magnitude and/or phase of incident energy that is scattered is modulated, thus allowing information to be transmitted. For example, in a first state, the antenna 112 may have a first impedance (e.g., a short circuit) to a reference node and may reflect the carrier signal 114 to provide a backscatter signal 116 that has a first signal magnitude and phase. In a second state, the antenna 112 may have a second impedance (e.g., an open circuit) to the reference node, and may reflect the carrier signal 114 to provide a backscatter signal 116 that has a second signal magnitude and phase. The first magnitude may be greater or less than the second magnitude. This yields an amplitude shift keying (ASK) backscattered signal. In further embodiments, the backscattered signal differs primarily in phase between the first state and the second state. This yields a phase shift keying (PSK) backscattered signal. It should be understood that more than two magnitude states may be employed, thus yielding a pulse amplitude modulated (PAM) backscattered signal. It should further be understood that more than two phase states, such as M states, may be employed, thus yielding an M-ary PSK backscattered signal. In still further embodiments, the impedances of the loads attached to the terminals of the antenna are chosen to affect both the magnitude and the phase of the backscattered signals in each of several states. In such embodiments, a quadrature amplitude modulation (QAM) backscattered signal may be produced.

By opening and closing the modulating switch in a time varying pattern, the scattering or reflectivity will be time varying, and thus information may be conveyed by the scattered or reflected signal. In some embodiments, the modulating switch is opened and closed once for each transmitted symbol. The rate of this time varying pattern may then be referred to as the symbol rate of the backscattered signal. The symbol rate is the rate at which the modulator changes its impedance state to convey different pieces of information (e.g. groups of one or more bits). It should be understood that circuits or structures other than a switch may be used to change the impedance state of the load connected to the antenna 112. Such devices as a PIN diode, a varactor diode, a field effect transistor, a bipolar transistor, or circuit combinations of these elements may also be used to change the impedance state of the load coupled to antenna 112. In examples described herein, an RF switch may be used.

The backscatter device 110 may include a modulator that may function to modulate the backscatter of the carrier signal 114, e.g. to switch an impedance of the load coupled to antenna 112 from a non-reflecting to a reflecting state. The backscatter device 110 may also provide a subcarrier frequency. In some examples, the subcarrier frequency may be provided, for example, by an oscillator. The switching or modulating action of the backscatter device 110 may mix the subcarrier frequency with the carrier frequency of the carrier signal 114 to adjust a frequency component of the backscatter signal 116. In this manner, the backscatter signal 116 may include a bandpass signal component having a predetermined frequency range, for example a frequency range specified by a wireless communication standard.

Examples of backscatter devices described herein, including the backscatter device 110 of FIG. 1, may have parameters selected to produce frequency components corresponding to at least one band-pass signal in the frequency spectrum of the scattered or reflected signal. These frequency components may be select to be compatible with a band-pass signal expected by a wireless communication device (e.g. the wireless communication device 106 of FIG. 1) such that the wireless communication device will accept and properly decode the transmitted backscattered signal. The transmitted backscattered signal may contain other frequency components that are outside of the desired band-pass signal but these components may be out-of-band with respect to the communication signal and thus discarded by the wireless communication device 106.

The wireless communication device 106 may accordingly receive the backscatter signal 116 at the antenna 108. While one antenna 108 is shown, multiple antennas may also be used. The wireless communication device 106 may be implemented using any device capable of wireless communication, including but not limited to, a cellular telephone, computer, server, router, laptop, tablet, wearable device, watch, appliance, automobile, or airplane. The wireless communication device 106 may communicate (e.g. include hardware and/or firmware and software for) using a particular protocol for a wireless communication signal (e.g. OFDM, Bluetooth Low Energy, Bluetooth Smart, Wi-Fi, CDMA, TDMA). The backscatter device 110 may provide a backscatter signal 116 formatted in accordance with the wireless communication protocol expected by the wireless communication device 106. In this manner, no further software, firmware, or hardware may be required for the wireless communication device 106 to receive and decode the backscatter signal 116 than is required for the wireless communication device 106 to receive and decode received signals from other sources that are formatted in accordance with the wireless communication protocol.

The wireless communication device 106 may employ a frequency shift keying (FSK) or Gaussian frequency shift keying (GFSK) standard having at least one or more specified frequency deviations, one or more specified channel center frequencies, and one or more specified symbol rates. In some examples, the aforementioned FSK or GFSK standard is that of the Bluetooth Low Energy specification as defined by the Bluetooth Special Interest Group (SIG). Accordingly, in some examples the backscatter device 110 may provide a backscatter signal 116 compatible with the FSK or GFSK standard employed by the wireless communication device 106.

The wireless communication device 106 may employ a phase shift keying (PSK) standard. Accordingly, in some examples the backscatter device 110 may provide a backscatter signal 116 compatible with the PSK standard. It should be appreciated that the PSK signal so generated may use two distinct phases to encode a symbol or a bit, or it may alternatively have more than two distinct phases to encode a symbol or a group of bits as in M-ary PSK.

The wireless communication device 106 may employ an amplitude shift keying (ASK) standard. Accordingly, in some examples the backscatter device 110 may provide a backscatter signal 116 compatible with the ASK standard. It should be appreciated that the ASK signal so generated may use two distinct amplitudes to encode a symbol or a bit, or it may alternatively have more than two distinct amplitudes to encode a symbol or a group of bits as in pulse amplitude modulation (PAM).

The wireless communication device 106 may employ a quadrature amplitude modulation (QAM) standard. Accordingly, in some examples the backscatter device 110 may provide a backscatter signal 116 compatible with the QAM standard. It should be appreciated that the QAM signal may have more than two distinct amplitudes and phase combinations to encode a symbol or a group of bits, as in M-ary QAM.

The wireless communication device 106 may employ an orthogonal frequency division multiplexing (OFDM) standard and/or technique. Accordingly, in some examples the backscatter device 110 may provide a backscatter signal 116 compatible with the OFDM standard and/or technique. This may be achieved by modulating the backscatter signal 116 with more than one subcarrier frequency at the same time. Each subcarrier may in turn be modulated with ASK, PAM, PSK, or QAM to form the OFDM backscattered signal.

While FIG. 1 depicts one backscatter device 110, the system may include more than one backscatter device, and multiple backscatter devices may be in communication with the wireless communication device 106 using signals backscattered from the signal source 102. Moreover, while FIG. 1 depicts one signal source 102, in some examples, the system may include more than one signal source.

Figure 2:
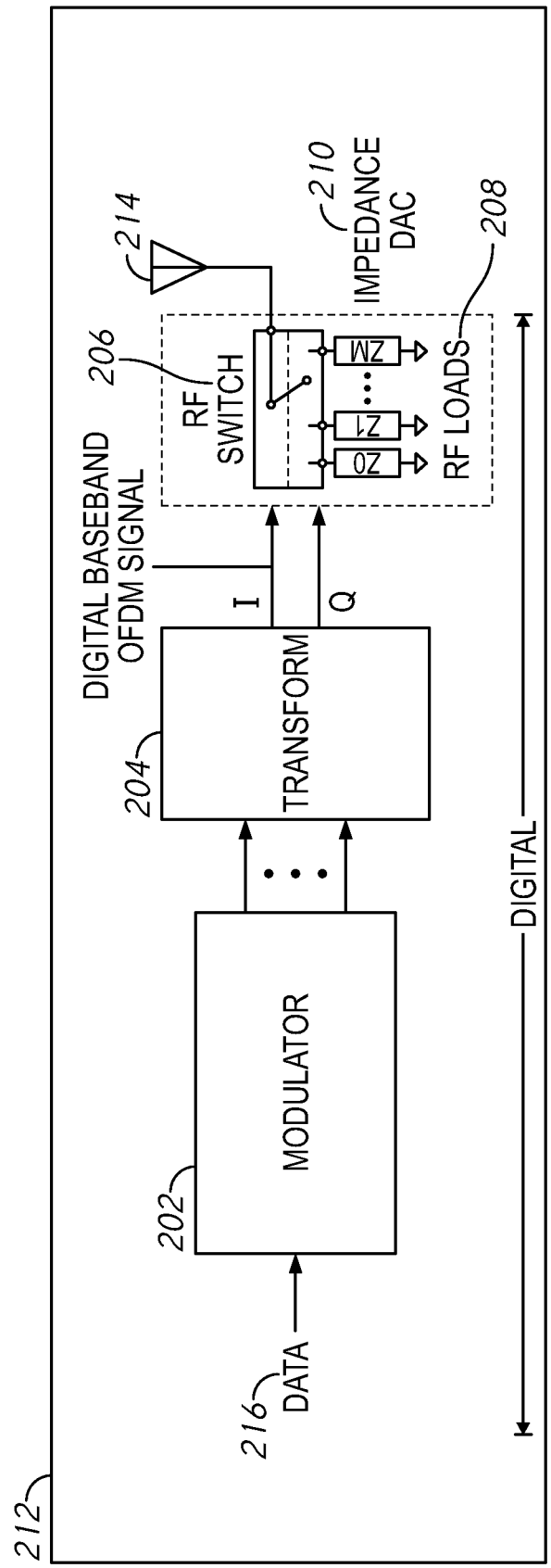
FIG. 2 is a schematic illustration of a backscatter device 212 arranged in accordance with examples described herein.

FIG. 2 is a schematic illustration of a backscatter device 212 arranged in accordance with examples described herein. The backscatter device 212 may receive data 216. The backscatter device 212 may include a modulator 202, antenna 214, and impedance DAC 210. The impedance DAC 210 may include switch 206 and impedances 208. The backscatter device 212 may include impedance DAC 210. The backscatter device 212 may be used to implement and/or may be implemented by the backscatter device 110 of FIG. 1 in some examples. During operation, data 216 may be provided to modulator 202. The modulator 202 may provide modulated data to transform 204. The transform 204 may provide a set of digital values to the impedance DAC 210 (e.g., to switch 206). The switch 206 may couple selected ones of the impedances 208 to the antenna 214 in accordance with the digital values to backscatter an incident signal, providing a backscatter signal.

The backscatter device 212 of FIG. 2 generally utilizes a digital backscatter architecture (e.g., the modulator 202, transform 204, and switch 206 may be digital components that may receive and/or manipulate digital signals). The backscatter device 212 of FIG. 2 may utilize an OFDM architecture in that the transform 204 may provide a digital baseband OFDM signal to the impedance DAC 210.

Examples of backscatter devices described herein may accordingly receive data, such as by receiving from another device, generating, and/or otherwise obtaining the data. Any of a variety of data may be used to encode into backscatter signals described herein. Examples of data include sensor data, audio data, video data, image data, and/or text data. The data may be digital data and/or analog data. The data may be formatted in accordance with any of a variety of formats, such as one or more packets such as WiFi packets and/or Bluetooth packets.

Examples of backscatter devices described herein may include a modulator, such as modulator 202 of FIG. 2. The modulator may receive data and provide modulated data. The modulated data may include one or more symbols. In some examples, the modulated data may include multi-tone symbol sequences. In some examples, the modulated data may include OFDM signals. The modulator 202 may receive the data 216 and may provide modulated data to transform 204. The modulator 202 may perform any of a variety of modulation techniques, including, but not limited to BPSK, QAM, or other kinds of modulation. In some examples, the modulator 202 may utilize one or more digitally tuned capacitors (DTCs) to provide a reconfigurable inductor-free modulator. In examples using OFDM, multiple band-pass signals may be generated by the modulator 202, one such bandpass signal per OFDM subcarrier. This may be implemented by providing multiple modulator frequencies such that their fundamental mode and/or harmonic mode frequency components align with the subcarrier spacing specified for the OFDM standard and/or technique. Each of the OFDM subcarriers may be modulated with e.g. a PSK signal per the description herein for PSK modulation examples. The multiple modulator frequencies may ultimately be applied to the same modulator. In some examples, a non-linear mixing operation may be implemented using a logic combination of the multiple modulator frequencies such as an exclusive-or (XOR) gate or an OR gate. In some examples, a linear operation may be employed via an analog power combination of the multiple modulator frequencies provided to the modulator 202.

Examples of backscatter devices described herein may include a transform, such as transform 204. The transform may convert modulated data provided by a modulator (e.g., by modulator 202) to a sequence of digital values, such as I and Q values for an OFDM baseband signal as shown in FIG. 2. Examples of transforms include one or more Fourier transforms, one or more inverse Fourier transforms (e.g., inverse fast Fourier transforms (IFFTs)), one or more pruned and/or sparse transforms, one or more look-up tables, sine-look-up tables, and/or numerically controlled oscillators (NCOs), such as one or more NCOs based on a sine look-up table. A pruned transform, may refer to an IFFT designed using pruning, which generally refers to reducing the complexity of the IFFT block by selectively eliminating some of the inputs or some of the outputs and thus reducing the number of computations to be computed in achieving the IFFT. An IFFT designed using pruning may be referred to as a sparse IFFT. In some examples, a transform may utilize one or more discrete Fourier transform approaches such as the inverse Goertzel algorithm. In some examples, the transform 204 may include two or more numerically-controlled oscillators which may provide desired frequency components of an OFDM signal to be transmitted. In some examples, the transform may include one or more look-up tables including pre-computed time domain sequences, which may be indexed by groups of symbols. Accordingly, the transform may receive modulated data (e.g., symbols), and provide one or more associated time domain sequences in accordance with the look-up table. In some examples, the look-up tables may include a sparse group of pre-computed time domain sequences indexed by groups of symbols. The number of time domain sequences may be less than a number of possible groups of symbols. Accordingly, some approximation may be made by backscatter devices described herein, such that multiple input symbols may be associated with a same output time domain sequence. In this manner, the output may not be as accurate as possible, but may nonetheless be usable. In some examples, the use of one or more look-up tables and/or numerically controlled oscillators may generate OFDM subcarriers without a need for a complex and power hungry IFFT. Accordingly, an output of the transform, such as transform 204 may be a sequence of digital values, and the digital values may correspond to symbol sequences. The symbol sequences may correspond to a digital baseband OFDM signal and may be multi-tone symbol sequences. Providing multi-tone symbol sequences for use in activating a switch described herein may allow an impedance DAC to generate orthogonal subcarriers.

In some examples (not shown in FIG. 2), backscatter devices described herein may include a pulse-density modulator. The pulse-density modulator may receive the sequence of digital values from the transform, such as from transform 204, and may provide a modulated output. Examples of pulse-density modulators which may be used include delta-sigma modulators and/or sigma-delta modulators. The output of the pulse-density modulator may be provided to the switch, such as switch 206. In some examples, the output of the pulse-density modulator may be filtered, e.g., by an analog filter, such as a low pass filter, and then provided to the switch (e.g., switch 206). In some examples, an output spectrum from the pulse-density modulator may include frequency components which are the desired frequency components of an OFDM signal to be transmitted.

Examples of backscatter devices described herein may utilize digital circuitry, and in some examples may utilize exclusively digital circuitry from receipt of the data to be encoded through the digital signal provided to a switch for selecting impedance(s) to couple to a backscatter device antenna. For example, the modulator and transform used in a backscatter device may be implemented using digital circuitry. For example, the modulator 202 and transform 204 may be implemented using digital circuitry, such as implemented using one or more field programmable gate array (FPGA) circuits, one or more application specific integrated circuits (ASICs), complex programmable logic devices (CPLDs), and/or microcontroller units (MCUs).

Examples of backscatter devices described herein may include an impedance digital-to-analog converter (DAC), such as impedance DAC 210. One or more RF switches used to switch between different discrete impedance states can be viewed as an impedance DAC. The switches and impedances may impact the frequency spectrum of the backscattered signal. The impedance DAC 210 may include one or more switches and one or more impedance elements (e.g., discrete impedances), such that the impedance DAC 210 may receive a digital signal and the switches may respond to the digital signal by selecting one or more of the impedance elements. In some examples, the impedance DAC may have as few as one-bit resolution (e.g., utilizing two switched impedance states) yet still generate multi-tone OFDM signals in a backscatter signal. Other number of impedance states may also be used, such as 3, 4, 5, 6, 7, or 8 impedance states. In some examples, a single pole-single throw (SPST) switch can be used and may provide 1-bit of impedance resolution. At a constant switching rate, a SPST switch can provide ON-OFF keying (OOK) or binary phase-shift keying (BPSK) modulations. However, in some examples, the switching rate of the SPST is modulated such that one of M different switching rates is selected for each symbol period, then M-ary frequency shift keying (FSK) modulation and/or phase modulation can be implemented. For example, a first switching rate (e.g., rate of switching between different impedances) may be used for one symbol of digital values provided from the transform 204. A second switching rate (e.g., a different rate of switching between the impedances) may be used for another symbol of digital values provided from the 204. Note that the use of a low-resolution impedance DAC (e.g., one-bit and/or two-bit resolution) to generate OFDM backscatter signals may be surprising, because decreasing the resolution generally creates non-linear distortion that might be expected to preclude the formation of multi-tone backscatter signals. Simulations and over-the-air tests demonstrated, however, that it is possible to generate and transmit an OFDM backscatter signal using a low-resolution impedance DAC having as low as one-bit resolution, and that this signal can be received and successfully decoded by a conventional OFDM receiver.

Accordingly, examples of backscatter devices described herein may include one or more switches, such as switch 206. The switches, such as switch 206, may be implemented using one or more RF switches, such as one or more digital CMOS RF switches, such as one or more digitally-controlled radio frequency (RF) switches. The switch 206 may be coupled to the transform 204 and may be controlled in accordance with a sequence of digital values provided by the transform 204. The switch 206 may, responsive to a control signal (e.g., the sequence of digital values provided by the transform 204), couple selected impedance(s) to an antenna. By coupling the selected impedances to an antenna in accordance with the control signals, the backscatter device 212 may backscatter an incident signal (e.g., the carrier signal 114 of FIG. 1) and transmit the data 216 encoded in a backscattered signal.

Using a switched modulator (e.g., a digitally-controlled RF switch) in examples may have several benefits over voltage-controlled variable impedances. The first is that the switch FETs may be biased as digitally controlled RF switches that connect externally provided impedances to the antenna, so fluctuations in the incident RF carrier power do not disrupt, or are less disruptive to, the modulator impedance. This may be a limitation of previously-described modulators using the FET itself as a variable impedance. Switch based implementations provide backscatter modulators that can achieve consistent, reliable operation over a wider range of incident carrier wave power. Secondly, the switch is controlled using all-digital logic that is widely available across circuitry such as generally low-cost MCUs, CPLDs, FPGAs, and ASICs. Once the impedances connected to the switch are determined, there may be no, or reduced, need for calibration to achieve repeatable operation. Lastly, CMOS RF switches can achieve data rates of on the order of tens of megabits per second to gigabits per second, due to their fast switching times. A disadvantage to using CMOS RF switches may be that the two-way insertion loss can often be >3 dB, however this can often be improved given attention to the switching FET device and the semiconductor process. Other RF switch technologies may be used to implement switches described herein, such as switch 206 including but not limited to silicon-on-insulator, PIN diode switches, MEMS switches, and GaAs or GaN switches.

Examples of backscatter devices may include one or more impedances, such as impedances 208. The impedances may be implemented using one or more digitally-controlled capacitors (DTCs) and/or one or more components having an impedance (e.g., one or more inductors, capacitors, and/or resistances). The impedances may be positioned to be selected by a switch, such as switch 206, and the selected impedances coupled by the switch to an antenna, such as antenna 214.

Examples of backscatter devices may include one or more antennas, such as antenna 214. A carrier signal may be incident on the antenna 214. Examples of carrier signals which may be incident on the antenna include those described with reference to FIG. 1. For example, the incident signal may include a continuous wave signal and/or a modulated signal. By selecting impedances to couple to the antenna 214, the backscatter device 212 may encode the data 216 into a backscattered signal.

Examples of backscatter devices described herein which may implement digital OFDM architectures may provide a number of advantages. Of course, not all examples may provide all, or even any, of the described advantages. Rather, the example advantages are described here to facilitate appreciation of the described architectures. Examples of all-digital architecture may produce repeatable impedances across a far broader range of incident carrier wave power than DAC-driven FET modulator architectures. OFDM backscatter architectures can be implemented in any digital logic device, including field-programmable gate arrays (FPGAs), complex programmable logic devices (CPLDs), microcontroller units (MCUs), and CMOS ASICs. Examples of OFDM backscatter architectures allow for easy configurability of the physical and link layer communication parameters, such as the number, frequency, and modulation of the subcarriers as well as the desired sideband relative to the incident carrier wave. Well-known OFDM packet structures to mitigate inter-symbol and inter-carrier interference can be used. Existing communication standards such as IEEE 802.11 (WiFi) and Bluetooth may be supported by selecting data packet formats and modulation formats compatible with such communication standards. This may be accomplished by matching or at least partially matching the data packet formatting (potentially including headers or preambles, data structures, cyclic redundancy codes, data whitening, and other parameters of the communication standards) along with symbol rates, subcarrier spacing, and number of subcarriers between the existing communication standard and the backscatter signals generated using the approaches described herein.

Figure 3:
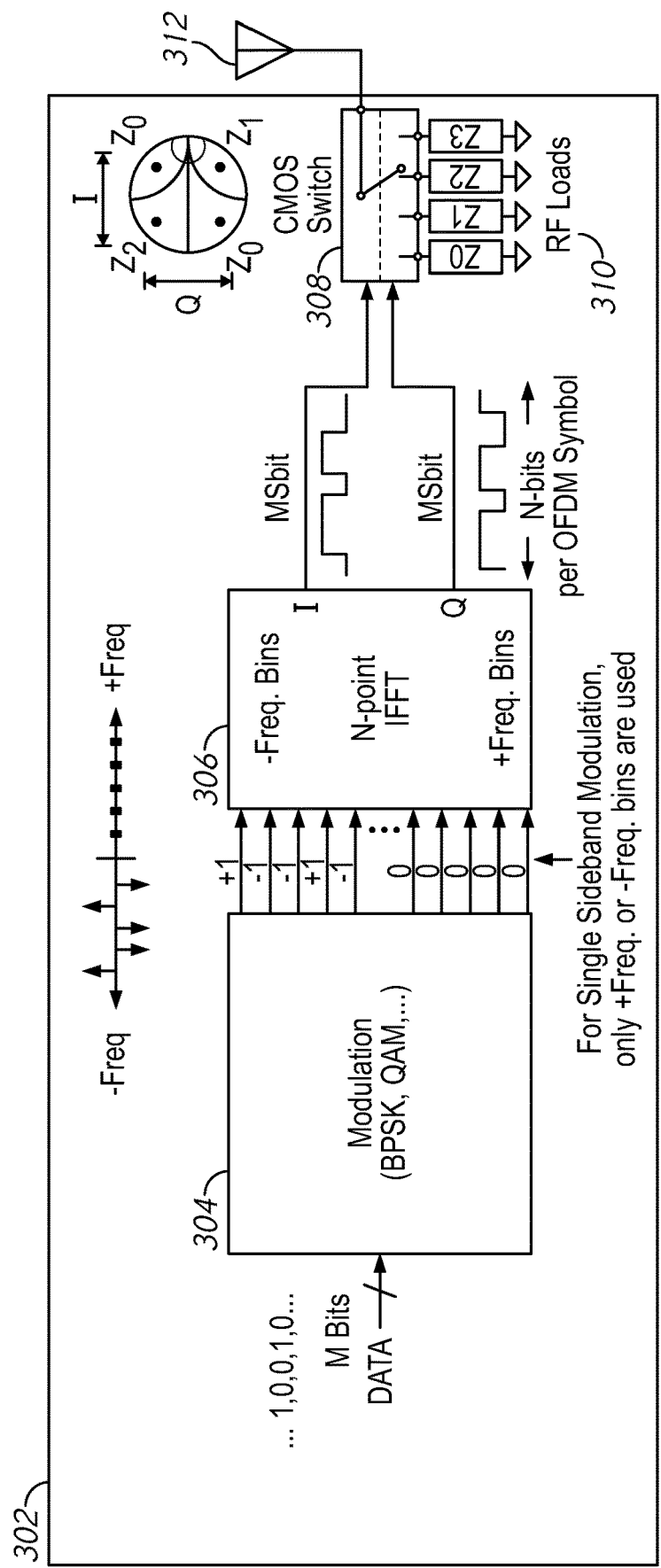
FIG. 3 is a schematic illustration of a backscatter device 302 utilizing an IFFT arranged in accordance with examples described herein.

FIG. 3 is a schematic illustration of a backscatter device 302 utilizing an IFFT arranged in accordance with examples described herein. The backscatter device 302 includes modulator 304, IFFT 306, switch 308, impedances 310, and antenna 312. The backscatter device 302 may be used to implement and/or may be implemented by the backscatter device 212 of FIG. 2 and/or the backscatter device 110 of FIG. 1 in some examples. The backscatter device 302 may operate in an analogous manner as described with respect to the backscatter device 212 of FIG. 2, with the transform 204 of FIG. 2 implemented using an IFFT.

The backscatter device 302 may be used to implement OFDM backscatter communication using a switched impedance modulator where OFDM subcarriers are generated using the IFFT 306. Note that no planar RF structures (e.g., splitters or combiners) may be used in implementing the backscatter device 302 in some examples. IFFTs, such as IFFT 306, may generally be implemented in digital logic and may utilize multipliers and block memory for storing intermediate calculations as well as look-up tables for the complex exponential roots of unity, also known as twiddle factors. In some examples, a 128-point Radix-2 Buffered-Burst IFFT generated using the Intel Quartus Prime FPGA design software may be used, and may utilize 24 multipliers, 2,000 bytes of RAM and over 3,000 logic elements. Other IFFTs, including other design software, multipliers, memory and logic elements may be used in other examples.

In backscatter device 302, data bits (e.g., M bits shown in FIG. 3) may be provided to modulator 304. The modulator 304 may use any of a variety of modulation techniques such as BPSK and/or QAM and/or others. The modulator 304 may map the bits to M complex-valued symbols. The modulator 304 may arrange the symbols in parallel and input the symbols into associated subcarrier frequency bins of an N-point IFFT. Undesired subcarrier frequency bins may be set to zero. In some examples, the input to the IFFT may be symmetric, with the same inputs being applied to corresponding positive and negative frequency bins. In such examples, the frequency spectrum may be double sideband and an output of the IFFT 306 may be a real-valued time domain signal that is N samples long. In some examples, the input to the IFFT 306 may be asymmetric, with inputs only applied to the positive or negative frequency bins. In the example depicted in FIG. 3, inputs are applied only to the negative frequency bins. The inputs being +1 or −1 for each bin. The inputs to the positive frequency bins are set to zero. In such examples, the output of the IFFT 306 may be complex, including a real (I) and imaginary (Q) component which may be each N samples long, as shown in FIG. 3. There may be N bits per each OFDM signal. Each sample will have its amplitude coded in one or more bits. In some examples, a length of a pulse may be indicative of an amplitude, for example.

The IFFT 306 may provide control signal(s) to the switch 308. A number of control signals may be related to a number of available switch states (e.g., number of impedance values which may be coupled to an antenna). For an RF switch with S switch states, a number of control signals c may be used where $c=\log_2(S)$. To obtain the appropriate number of control signals, an output of the IFFT 306 may be truncated to obtain a number of bits equal to the number of desired control signals. For example, the switch 308 may be a single pole-four throw (SP4T) switch which may have four switch states. The switch 308 may utilize two control bits. Accordingly, the most significant bit (MSB) from each of the I and Q signals may be used as control bits to actuate the switch 308 among its four possible states. In the example of FIG. 3, the four states reflect a selection of one of the impedances 310-Z0, Z1, Z2, and/or Z3. The selected impedance may be coupled to the antenna 312. As a result of the truncation, a wideband noise floor may be elevated relative to an implementation having more switch states, however the desired frequency components may still be generated.

Figure 4A:
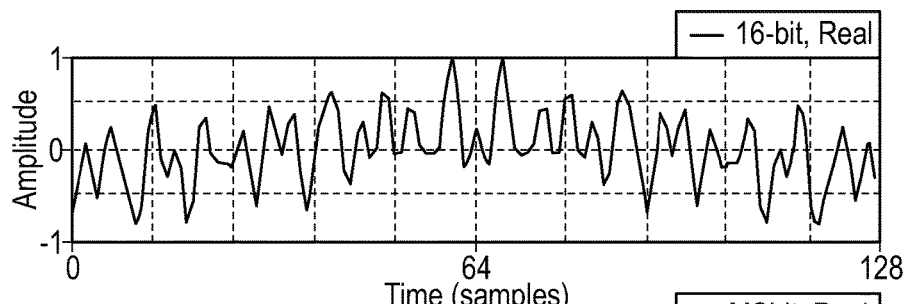
FIGS. 4A-4E are simulations of signals being provided in the backscatter device 302 arranged in accordance with examples described herein.
Figure 4B:
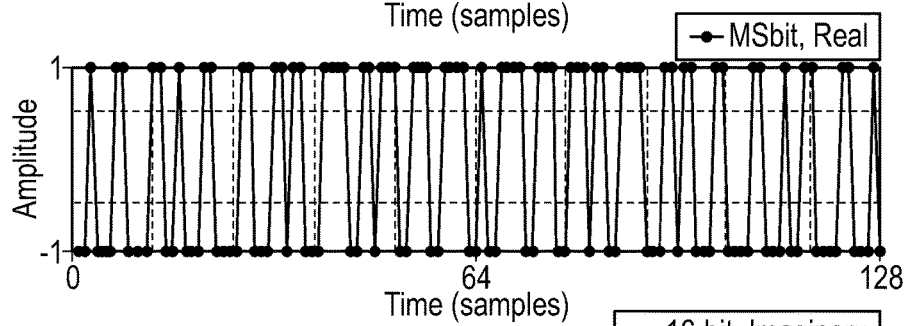
Figure 4C:
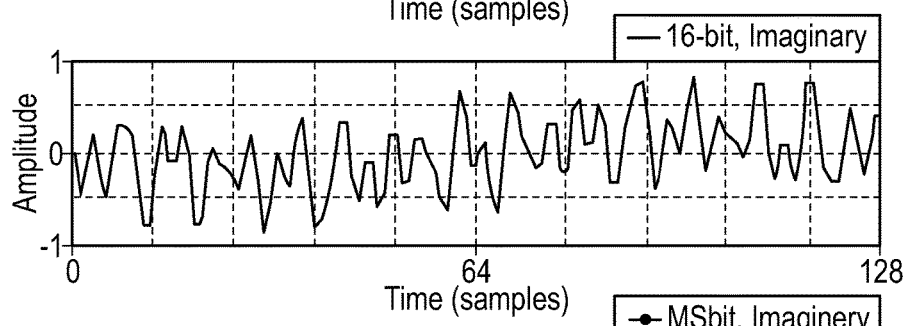
Figure 4D:
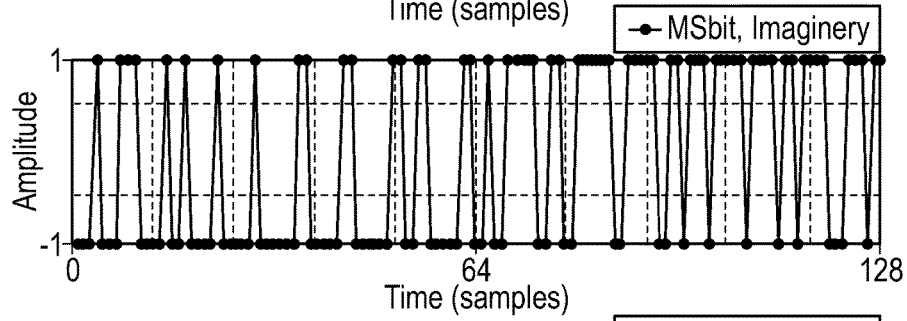

FIGS. 4A-4E are simulations of signals being provided in the backscatter device 302 arranged in accordance with examples described herein. FIG. 4A is a real portion of an output of IFFT 306 with 16 bit resolution. The signal is shown as amplitude on the y-axis and time (which corresponds to samples) on the x-axis. FIG. 4B is a simulation of the 16-bit resolution signal of FIG. 4A, the real portion of the output of IFFT 306, truncated to the most significant bit. The signal is shown as amplitude on the y-axis and time (which corresponds to samples) on the x-axis. In the example of FIG. 4B, where only a single bit is retained per sample, the amplitude is accordingly either 1 or 0 for each sample. FIG. 4C is an imaginary portion of the output of IFFT 306 with 16 bit resolution. The signal is shown as amplitude on the y-axis and time (which corresponds to samples) on the x-axis. FIG. 4D is a simulation of the 16-bit resolution signal of FIG. 4C, the imaginary portion of the output of IFFT 306, truncated to the most significant bit. In the example of FIG. 4D, where only a single bit is retained per sample, the amplitude is accordingly either 1 or 0 for each sample.

Figure 4E:
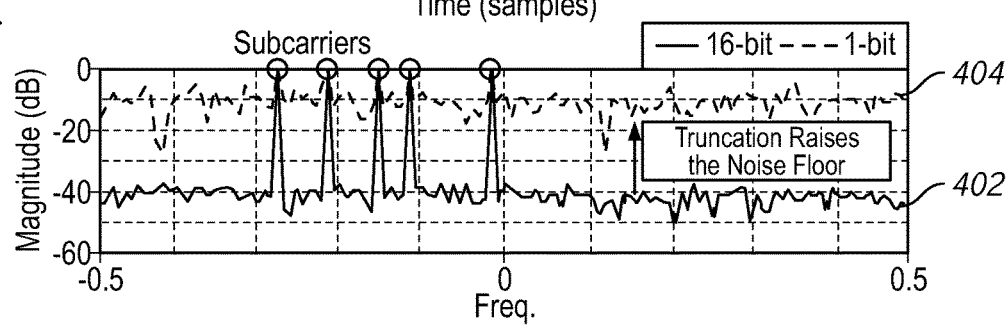

FIG. 4E is a Fourier transform of the complex output of IFFT 306. That is, FIG. 4E depicts magnitude along the y-axis and frequency along the x-axis. FIG. 4E depicts a signal 402 corresponding to the 16-bit versions of IFFT output shown in FIG. 4A and FIG. 4C, and a signal 404 corresponding to the most significant bit versions of IFFT output shown in FIG. 4B and FIG. 4D. Note that the truncation to a single bit raises the noise floor, as can be seen by the generally higher magnitude of the signal 404 compared to the signal 402. However, the same subcarrier peaks, shown with circles in FIG. 4E, are retained in both signal 402 and signal 404.

Figure 5:
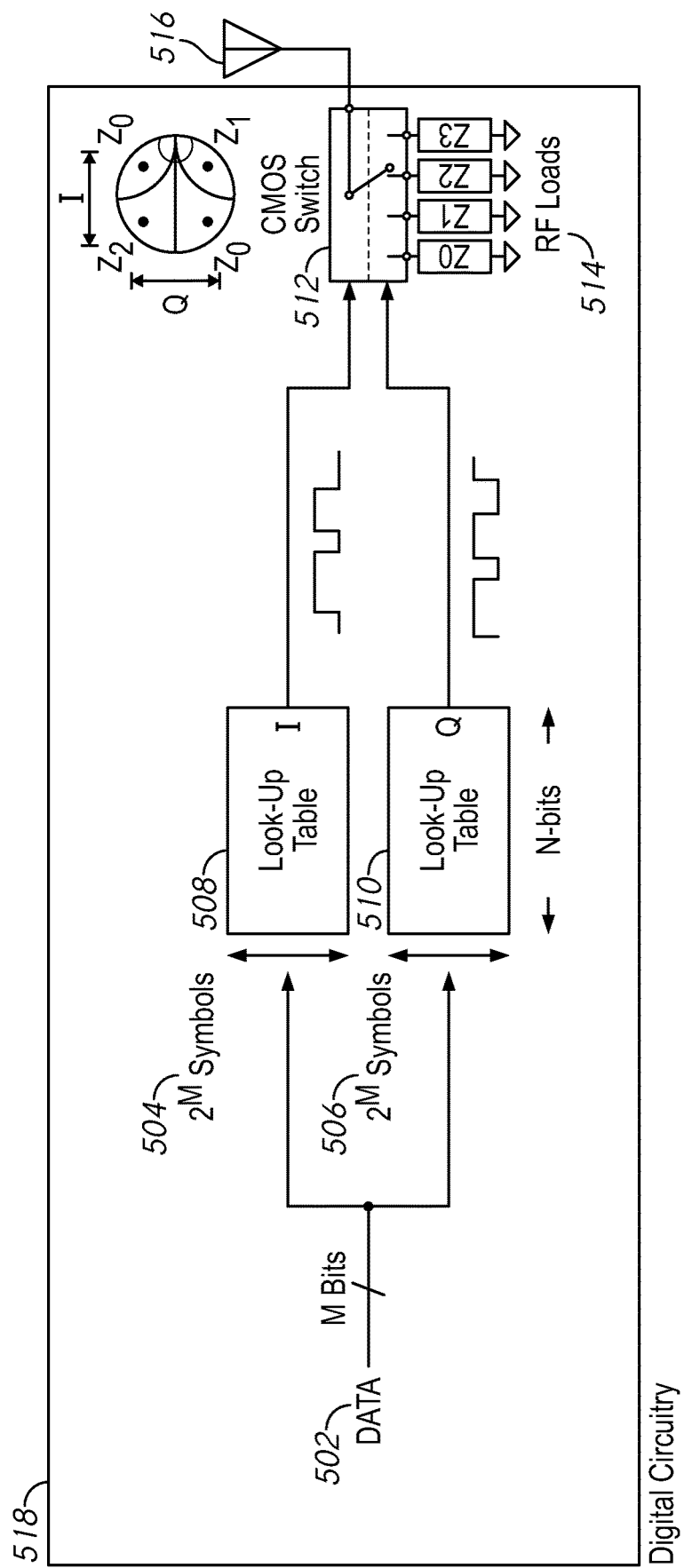
FIG. 5 is a schematic illustration of a backscatter device 518 utilizing look-up tables arranged in accordance with examples described herein.

FIG. 5 is a schematic illustration of a backscatter device 518 utilizing look-up tables arranged in accordance with examples described herein. The backscatter device 518 may obtain data 502, convert the data into symbols 504 and symbols 506. The symbols 504 may be provided to a look-up table 508 to provide output streams of digital values associated with each symbol. The symbols 506 may be provided to look-up table 510 to provide output streams of digital values associated with each symbol. The output streams from look-up table 508 and look-up table 510 may be provided as control signals to switch 512. The switch 512 may select one or more impedances 514 to couple to antenna 516 in accordance with the control signals. The backscatter device 518 may be used to implement and/or may be implemented by the backscatter device 212 of FIG. 2 and/or the backscatter device 110 of FIG. 1. The discussion of backscatter device 518 will focus on the portion of backscatter device 518 which provides a specific example relative to the description of backscatter device 212, and in particular the use of look-up tables. Other aspects of backscatter device 518 may be analogous to those described with reference to backscatter device 212 and/or backscatter device 110 of FIG. 1.

The architecture of FIG. 5 may be advantageous in some examples where certain low power digital devices may be desired to use to implement the backscatter device, but the low power digital device does not have dedicated multiplier blocks and/or a desired number of logic elements to compute an IFFT. For example, a LATTICE SEMICONDUCTOR iCE40 FPGA and/or MachX02 CPLD may not have sufficient hardware to compute an IFFT. Accordingly, OFDM backscatter symbols may be pre-computed and stored in look-up tables, which may reduce resources required to implement backscatter device 518, since the backscatter device 518 will not need to compute a full IFFT directly.

Accordingly, backscatter devices described herein may include one or more look-up tables, such as look-up table 508 and look-up table 510 of FIG. 5. The look-up tables may be implemented using logic devices which may be used (e.g., programmed and/or arranged) to translate incoming signal(s) to output signal(s). In some examples, the look-up tables may be implemented using memory and/or storage devices. In some examples, sparse look-up tables may be used, e.g., the look-up table 508 and/or look-up table 510 may be a sparse look-up table. A sparse LUT generally refers to a LUT that may not have entries corresponding to at least some possible inputs and/or outputs as compared to a LUT implementing all possible combinations of inputs and outputs. Sparse LUTs accordingly may include those that take advantage of symmetry (such as ¼ wave sine LUT) where there is a multiple-to-one mapping between inputs and outputs. Accordingly, multiple inputs may result in a same output. In some examples, that results in a lack of precision, however in other examples, the result may be accurate (e.g., in examples where multiple inputs accurately yield a same output, such as in symmetric situations). In some examples, a 128-point IFFT LUT may be used which may be implemented using 505 logic elements (e.g., 505 logic gates). In other examples, an IFFT LUT may be implemented using other forms of memory, like block random access memory (BRAM). In other examples, other numbers of logic elements may be used, and other sizes of LUTs may be used.

Look-up tables which may be used by backscatter devices described herein may relate pre-computed time domain sequences to one or more OFDM symbols. The pre-computed time domain sequences may be indexed by groups of symbols. In this manner, a pre-computed time domain sequence may be output which corresponds to an input symbol or group of symbols. In a sparse LUT example, the number of time domain sequences which may be output may be less than the number of possible groups of symbols which may be input—that is, multiple input symbols or groups of symbols may be mapped to a same output time domain sequence.

Accordingly, data 502 may be obtained by the backscatter device 518 for transmission. M bits of data 502 are indicated in FIG. 5. The data 502 may be represented as symbols, e.g., OFDM symbols. The symbols may be generated from the data 502 using, for example one or more modulators (not shown in FIG. 5). As shown in FIG. 5, $2^M$ symbols may be generated and provided to look-up table 508. The look-up table 508 may accordingly store one or more pre-computed time domain sequences indexed by symbol, such that the look-up table 508 may output a time domain sequence corresponding to an input symbol or group of symbols. The look-up table 508 may be used to generate the imaginary portion of output signals. For example, the pre-computed time domain sequences stored by the look-up table 508 may be pre-computed time domain sequences for the real (in-phase, "I") portion of a transform output. Similarly, $2^M$ symbols may be generated and provided to look-up table 510. The look-up table 510 may accordingly store one or more pre-computed time domain sequences indexed by symbol, such that the look-up table 510 may output a time domain sequence corresponding to an input symbol or group of symbols. The look-up table 510 may be used to generate the imaginary (quadrature, "Q") portion of output signals. For example, the pre-computed time domain sequences stored by the look-up table 510 may be pre-computed time domain sequences for the imaginary portion of a transform output.

The output of the look-up tables look-up table 508 and look-up table 510 may accordingly approximate and/or be equivalent to an output of an IFFT in some examples. Accordingly, the look-up table 508 and/or look-up table 510 may be used to implement a transform as described herein, such as transform 204 of FIG. 2. The time-domain sequences output from the look-up table 508 and/or look-up table 510 may be provided as control signal(s) to the switch 512. The switch 512 may select impedances of the impedances 514 in accordance with the control signals. Four impedances are shown in FIG. 5—Z0, Z1, Z2, and Z3, however any number may be used. The selected impedance(s) may be coupled to the antenna 516 to result in a backscatter signal encoding the data 502 formatted in accordance with one or more OFDM signals. The backscattered signal may then be received by any device capable of receiving an OFDM signal, such as the wireless communication device of FIG. 1.

Figure 6:
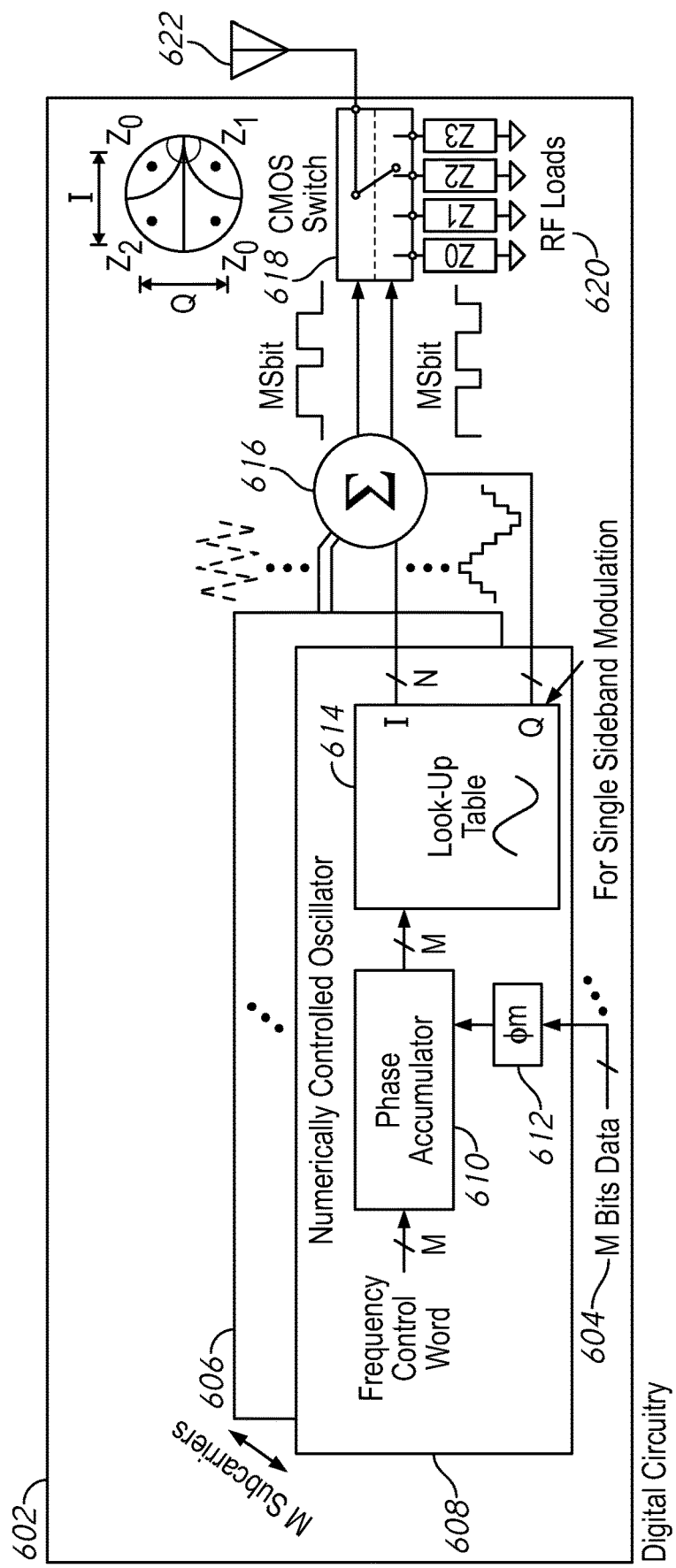
FIG. 6 is a schematic illustration of a backscatter device 602 utilizing numerically controlled oscillators arranged in accordance with examples described herein.

FIG. 6 is a schematic illustration of a backscatter device 602 utilizing numerically-controlled oscillators arranged in accordance with examples described herein. The backscatter device 602 may obtain data 604. The backscatter device 602 includes multiple numerically controlled oscillators 606, including numerically-controlled oscillator 608. The data 604 is provided to the numerically controlled oscillators 606. Each of the numerically controlled oscillators 606 may have a frequency control word provided to an accumulator 610 to determine the frequency of the numerically controlled oscillator. The data 604 may be provided to a phase mapper 612 which in turn may be provided to the accumulator 610 to modulate the phase of the numerically controlled oscillator. An output of the accumulator 610 may be provided as an input to a look-up table 614. The look-up table 614 may output time domain sequences corresponding to the input symbols received from the accumulator 610. In examples utilizing double-sideband operation, the look-up table 614 may provide one-sided output (e.g., only the real portion I or only the imaginary portion Q). In examples utilizing single-sideband operation, the look-up table 614 may provide two-sided output (e.g., both the real portion I and the imaginary portion Q). There may be generally one numerically-controller oscillator for each subcarrier. The outputs of all the numerically-controlled oscillators may be combined by combiner 616. The combiner 616 may accordingly output control signal(s) and provide the control signal(s) to switch 618. The switch 618 may select one or more of the impedances 620 to couple to the antenna 622, where the selection may be in accordance with the control signal(s). In this manner, the antenna 622 may be used to backscatter a signal encoding the data 604 in an OFDM format.

The backscatter device 602 may be used to implement and/or may be implemented by other backscatter devices described herein, such as backscatter device 212 of FIG. 2 and/or backscatter device 110 of FIG. 1.

Accordingly, backscatter devices described herein may include one or more numerically-controlled oscillator (NCO), such as numerically-controlled oscillator 608. Generally, each NCO may be dedicated for a particular subcarrier. Each NCO may be characterized by its phase resolution, e.g., a number of samples per sinusoidal period $N_{NCO}$, and the amplitude resolution (e.g., number of bits per sample). The output frequency of the NCO may then be controlled by a frequency control word, $f_{ctl}$, such that the output frequency of an NCO may be given by $$F_{out} = \frac{f_{ctl}}{N_{NCO}} * f_s,$$

where $f_s$ is the sample rate. The frequency word for each NCO may be selected such that each NCO is dedicated to a particular subcarrier frequency.

Each NCO may include a LUT. The LUT may be a sinusoidal LUT, e.g., a full sinusoidal LUT, such as look-up table 614. The LUT may avoid or reduce a need to provide an oscillator or frequency reference to the NCO. Rather, the LUT may output pre-computed time sequence values corresponding to input signals. In one example, the numerically-controlled oscillator 608 may be implemented using a full sinusoidal LUT having 11-bit phase resolution and 16-bit amplitude resolution. In this manner, each NCO may utilize approximately 1600 logic elements. In examples where symmetry in a sinusoidal signal may be exploited, however, it may be possible to generate a same output using a ¼-wave LUT. Other implementations of LUTs may also be used. Generally, the LUTs may be implemented using logic elements positioned and/or programmed to perform a mapping from the input accumulated phase to output time domain sequences for the subcarrier.

The output of each NCO in a backscatter device may be combined in a combiner, such as combiner 616. The combiner 616 may be implemented using an adder, e.g., a digital adder, in some examples. In some examples, the combination may be performed after accounting for potential bit growth. The combiner 616 may provide a combined signal as an output. The combined signal may be provided as control signal(s) to switch 618. In some examples, the combined signal may be truncated before providing the combined signal to the switch 618. For example, only the most significant bit(s) of the combined signal may be provided to the switch 618 in some examples. The switch 618 may select impedances from impedances 620 in accordance with the control signals received from the combiner 616. For example, four impedances are shown in FIG. 6—Z0, Z1, Z2, and Z3—although any number may be used. By selecting impedances to couple to the antenna 622, the backscatter device 602 may provide a backscatter signal encoding the backscatter device 602 in the format of an OFDM signal.

Architectures utilizing multiple NCOs, such as backscatter device 602, may be advantageous in applications that utilize real-time configurability for a relatively small number of subcarriers.

Examples of backscatter devices described herein may utilize one or more waveform generators to condition an output signal of a transform. For example, one or more waveform generators may be provided after the transform, such as after transform 204. The waveform generator may receive an output of the transform 204, manipulate the signal, and provide a manipulated signal as the control signal to a switch, such as switch 206 of FIG. 2. Examples of waveform generators which may be used include, but are not limited to, a delta-sigma modulator, sigma-delta modulator, a pulse-density modulator, or similar circuit, or combinations thereof. For example, a delta-sigma modulator waveform generator may receive an real (I) and imaginary (Q) output symbol from the transform 204, with each I and Q symbol having N samples with P bits of resolution per sample. The delta-sigma modulator waveform generator then may convert each I and Q symbol to have more than N samples with less than P bits of resolution per sample. The waveform generator may generally use a clock frequency in excess of a symbol rate of the data to be transmitted, such as data 216. Additional circuitry may further be provided to further manipulate the signal provided by the waveform generator, such as one or more filters. The use of waveform generators may advantageously increase the apparent precision of the switch when acting as an impedance DAC.

Figure 7:
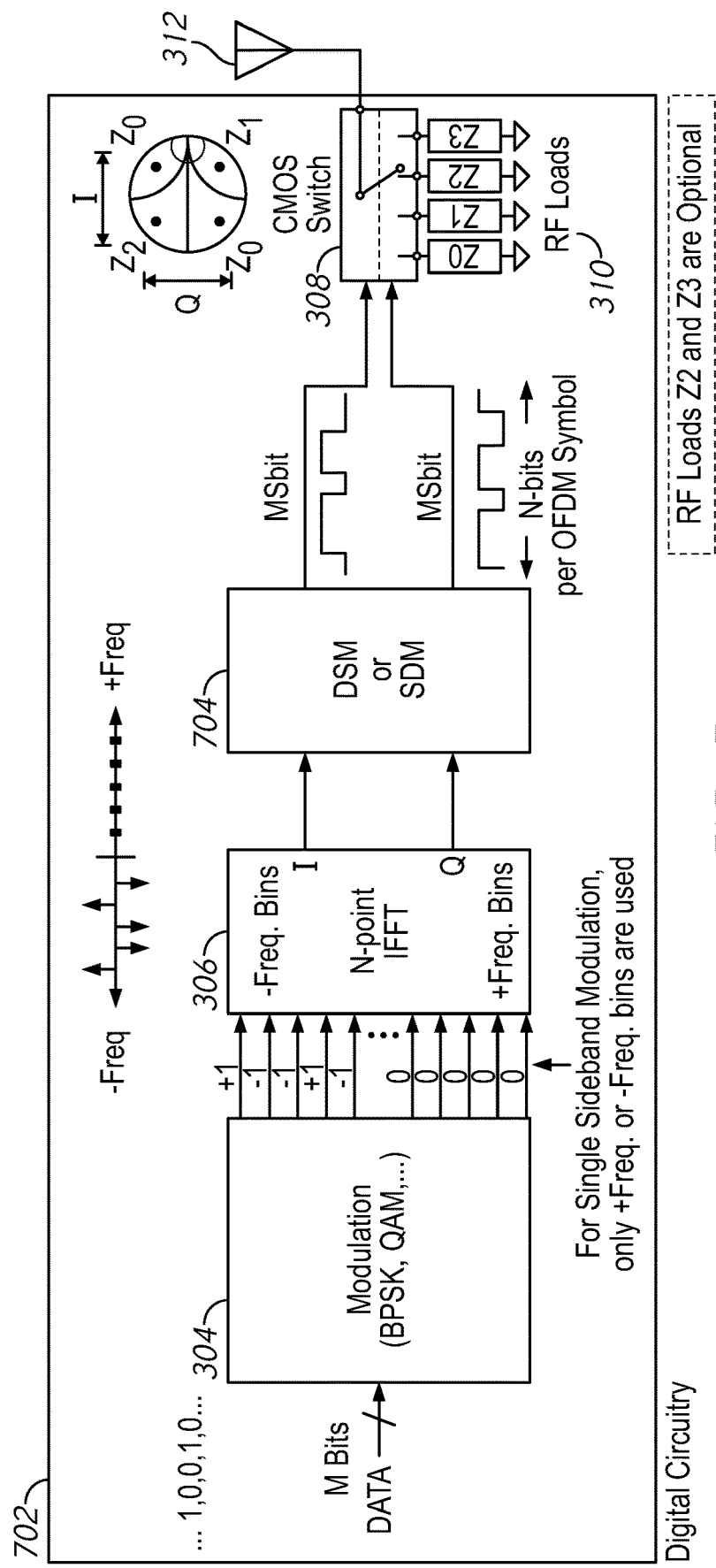
FIG. 7 is a schematic illustration of a backscatter device 702 including a waveform generator 704 arranged in accordance with examples described herein.

FIG. 7 is a schematic illustration of a backscatter device 702 including a waveform generator 704 arranged in accordance with examples described herein. The backscatter device 702 is analogous to backscatter device 302 of FIG. 3, and like components are labeled with like reference numbers. However, the backscatter device 702 includes waveform generator 704 coupled between the IFFT 306 and the switch 308. The waveform generator 704 may be implemented, for example, using a delta-sigma modulator, sigma-delta modulator, a pulse-density modulator, or similar circuit, or combinations thereof. The waveform generator 704 may provide a stream of pulses have frequency components including the desired frequency components of OFDM signals to be transmitted. In some examples, a filter, such as a low-pass filter, may be provided between waveform generator 704 and switch 308.

Figure 8:
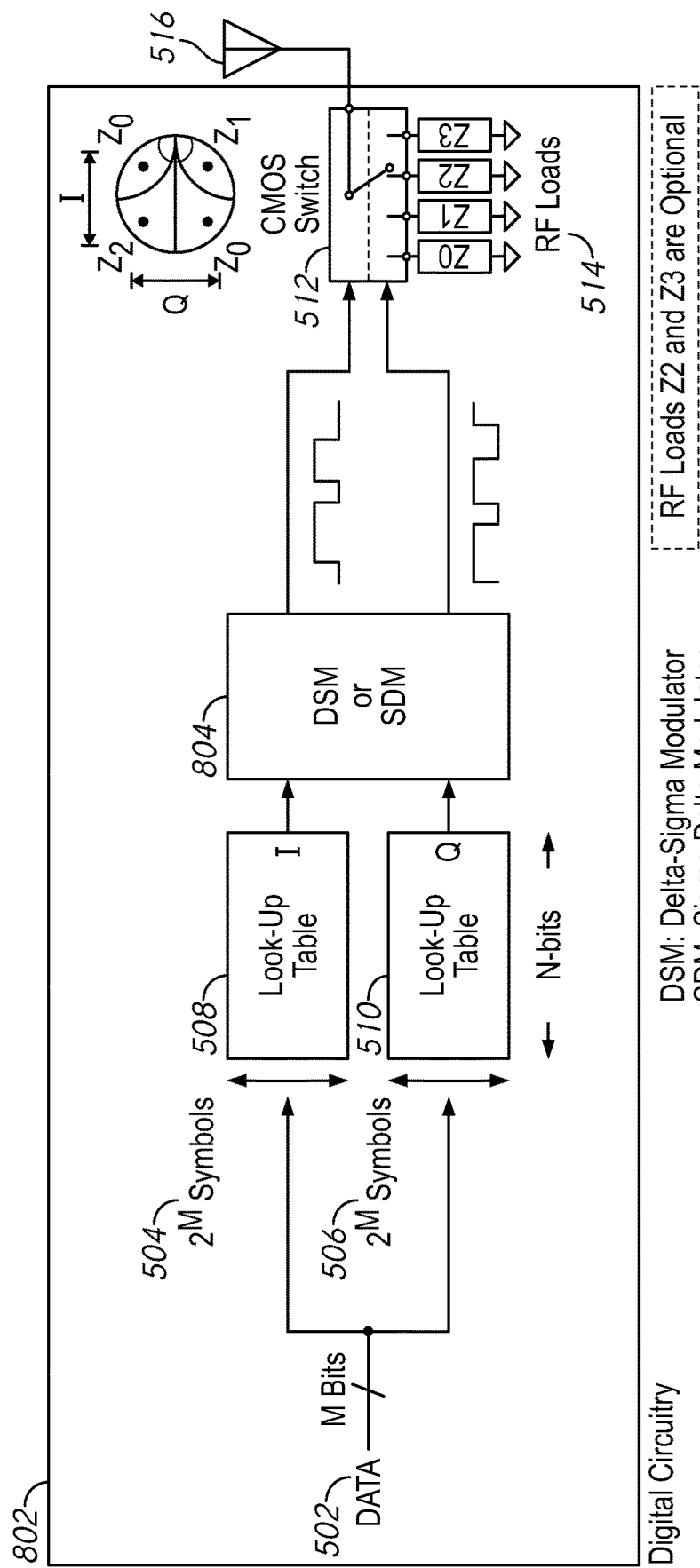
FIG. 8 is a schematic illustration of a backscatter device 802 including a waveform generator 804 arranged in accordance with examples described herein.

FIG. 8 is a schematic illustration of a backscatter device 802 including a waveform generator 804 arranged in accordance with examples described herein. The backscatter device 802 is analogous to backscatter device 518 of FIG. 5, and like components are labeled with like reference numbers. However, the backscatter device 802 includes waveform generator 804 coupled between the look-up table 508 and look-up table 510 and the switch 512. The waveform generator 804 may be provided the output sequences from the look-up table 508 and/or look-up table 510, and may provide conditioned output sequences to the switch 512. The waveform generator 804 may be implemented, for example, using a delta-sigma modulator, sigma-delta modulator, a pulse-density modulator, or similar circuit, or combinations thereof. The waveform generator 804 may provide a stream of pulses have frequency components including the desired frequency components of OFDM signals to be transmitted. In some examples, a filter, such as a low-pass filter, may be provided between the waveform generator 804 and the switch 512.

SIMULATIONS AND IMPLEMENTED EXAMPLES

In examples of the OFDM Backscatter architectures described herein, the choice of the RF switch and the impedances connected to it may impact the backscattered frequency spectrum. Numerical simulations were performed to explore the effects that number of RF switching throws and impedance values would have. Simulations were performed in MathWorks MATLAB R2018a software. In the simulations, the simplified IFFT LUT architecture was used based on a 128-point IFFT. Referring to FIG. 5, the simulations used M=5 bits per symbol with an incoming symbol rate to component 502 of 250 kSymbols/sec. Time-domain sequences of digital samples corresponding to OFDM symbols were output from look-up tables 508 and 510 at a sample rate of 32 MSamples/sec. The in-phase (I) and quadrature (Q) time-domain sequences of digital samples corresponding to OFDM symbols were pre-calculated and loaded into the look-up tables 508 and 510, respectively. The OFDM symbols were calculated for M=5 subcarriers (subcarrier frequencies of 250 kHz, 3.5 MHz, 4.75 MHz, 6.75 MHz, and 8.75 MHz). Each subcarrier was modulated using BPSK modulation, leading to 2^5=32 possible OFDM symbols. Single-sideband OFDM symbols consisted of a time-domain sequence of digital samples from both the I and Q look-up tables. Double-sideband OFDM symbols consisted of a time-domain sequence of digital samples from either the I or Q look-up tables.

Figures 9A, 9B, 9C, 9D:
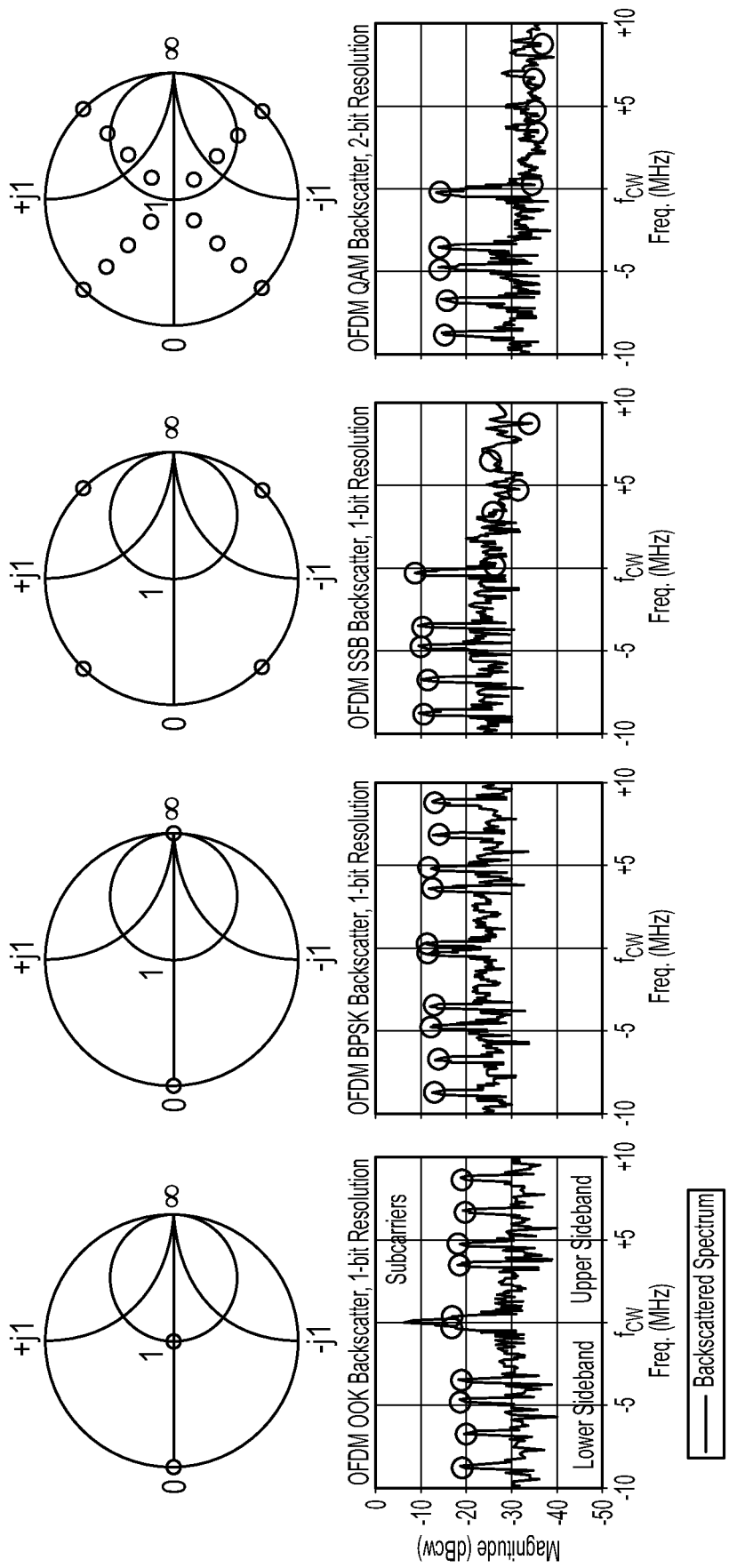
FIG. 9A-9D are simulations of OFDM backscatter spectral power using five subcarriers and different impedance configurations.

Four different RF switch configurations were simulated, as shown in FIGS. 9A-9D. FIG. 9A-D are simulations of OFDM backscatter spectral power using five subcarriers and different impedance configurations. FIG. 9A was simulated using two real-valued reflective impedances that are absorptive and reflective. FIG. 9B was simulated using two real-valued reflective impedances that are 180 degrees out of phase. FIG. 9C was simulated using four complex-valued reflective impedances that are 90 degrees out of phase, providing single sideband modulation. FIG. 9D was simulated using sixteen complex-valued reflective impedances. FIG. 9A-9B may be implemented using a two-throw switch. FIG. 9C may be implemented using a four-throw switch. FIG. 9D may be implemented using a sixteen-throw switch. The first two simulation cases (FIGS. 9A and 9B) used single pole-single throw (SPST) RF switches, with one simulation using absorptive and reflective impedance states and other using two reflective states 180 degrees out of phase. For these two simulations, only the in-phase (I) signal was used to actuate the RF switch, yielding an impedance DAC resolution of one-bit. The third simulation (FIG. 9C) case represented a single pole-four throw (SP4T) RF switch and used four reflective impedance states that were 90 degrees out of phase relative to adjacent states. This situation simulated single sideband backscatter modulation. Both the in-phase (I) and quadrature (Q) control signals were used, each with one-bit resolution, as shown in FIGS. 4A-4E. The fourth simulation case (FIG. 9D) simulated a single pole-sixteen throw (SP16T) RF switch. The impedance values were chosen to implement single sideband modulation using the in-phase (I) and quadrature (Q) control signals with two-bit resolution each. The switches and impedances that were simulated and described with respect to FIGS. 9A-9D may be used, for example, to implement the switches and impedances shown in FIG. 2, FIG. 3, FIG. 5, FIG. 6, FIG. 7, and/or FIG. 8.

The backscatter power spectrum was estimated for each simulation case to compare performance of the different switch and impedance configurations. The power spectra were estimated by calculating the power spectral density (PSD), $S(f)=\lfloor \mathcal{F} \overline{R}(\tau) \rfloor$ and multiplying it by the estimated noise bandwidth of the window, where $\mathcal{F}[\ ]$ denotes the Fourier transform and $\overline{R}\tau$ denotes the average auto-correlation of the OFDM time-series samples.

From the power spectrum plots of FIGS. 9A-9D, note that single sideband (SSB) backscatter modulation in (c) had the strongest subcarrier power levels with a maximum of −14.7 dB relative to the incident carrier wave (abbreviated as dBcw). BPSK backscatter modulation in case (b) had the second highest subcarrier power at −17.3 dBcw, while 16-QAM in case (d) was −18 dBcw and OOK in case (a) was −21 dBcw. Given that the reflected power is a function of the vector distance between impedance states, these results are as expected.

The subcarrier interference ratio (SIR) may be examined by comparing the worst-case relative power levels of spurious tones between subcarriers to the power levels of the subcarriers. The SIR is found to be −6.7 dB, −8.4 dB, −10.2 dB, and −11.1 dB for cases (a)-(d), respectively. This result demonstrates that SIR appears to improve based on two factors: (1) as the minimum distance between reflection states, $|\delta\Gamma_{min}|$, increases, and (2) as the resolution of the impedance DAC increases from one bit in cases (a) and (b) to two bits in case (c) and to four bits in case (d).

For cases (c) and (d) the sideband rejection ratio (SRR) may be calculated by comparing to the DSB modulation from case (b). SRR is calculated as the ratio of gain in the desired sideband relative to the attenuation in the undesired sideband at a given subcarrier offset frequency:

$$1.\ SRR_{dB} = \frac{\text{Subcarrier Gain (dB)}}{\text{Subcarrier Attenuation (dB)}}$$

SSB backscatter modulation in case (c) achieves an SRR of 17.7 dB while 16-QAM backscatter modulation in case (d) achieves an SRR of 21.5 dB. Despite case (d) achieving a higher SRR, the subcarrier gain in the desired sideband is actually negative, decreasing from a maximum of −17.3 dBcw in case (b) to a maximum of −18 dBcw in case (d). This can likely be attributed to the greater $|\delta\Gamma_{min}|$ in case (b). Interestingly, the attenuation of the subcarriers in the upper sideband is 30 dB in the worst case for case (d) while it is 25.4 dB in the worst case for (c), yielding a difference of 4.6 dB.

Bit-error ratio (BER) simulations were performed to investigate how resolution in the IFFT affects data transmission. The simulations used the IFFT architecture as shown in FIG. 3. The IFFT was implemented in Matlab as a 128-point Radix-2 IFFT algorithm using fixed-point data. The fixed-point data was defined by the total bit width and the fractional length. These parameters were applied to the data as well as the twiddle factors, which are pre-calculated values of a unity magnitude complex exponential at different phase angles that are needed to calculate the IFFT. For transmitting data, five subcarriers with BPSK modulation were used, and four ideal reflective states were assumed for the backscatter modulator, as in the simulation of FIG. 9C. The data was passed through an additive white Gaussian noise channel, and the received symbols were processed using a coherent receiver assuming perfect synchronization. For each value of the energy-per-bit-to-noise-ratio, $$\frac{E_b}{N_0},$$

either 10⁶ bits were transmitted or 200 bit errors accumulated, whichever came first. In this simulation framework, OFDM backscatter in general performed approximately 4.5 dB worse than the theoretical binary antipodal modulation for independent subcarriers in a non-fading channel. This decrease in performance is likely due to the non-linear bit truncation occurring between the IFFT and the backscatter modulation, which generates residual wideband noise, harmonics and inter-modulation distortion. Among the backscatter signals simulated, the case using data and twiddle factors of type floating-point double performed the best, as expected, given that it provides the highest resolution of the signal.

Surprisingly, comparable BER performance is achieved for bit resolutions as low as four total bits with two fractional bits. BER performance then severely degrades for the cases of four total bits with three fractional bits ("Width: 4, Frac: 3") and two total bits with zero fractional bits ("Width: 2, Frac: 0"). These results suggest that OFDM backscatter implementations may advantageously leverage significantly reduced IFFT implementations. Not only can the data and twiddle word sizes be reduced, but many of the arithmetic cycles can be eliminated since in a single sideband implementation with relatively few carriers, many of the IFFT calculations result in zeros or near-zero values.

Measurements were performed to validate the power spectrum and wireless uplink capabilities of an OFDM backscatter design. The measurements were performed by implementing the simplified IFFT LUT architecture previously mentioned (e.g., FIG. 5) on a TinyFPGA BX, an open source hardware platform that uses a Lattice Semiconductor iCE40 FPGA. A block diagram of the digital design is shown in FIG. 10.

Figure 10:
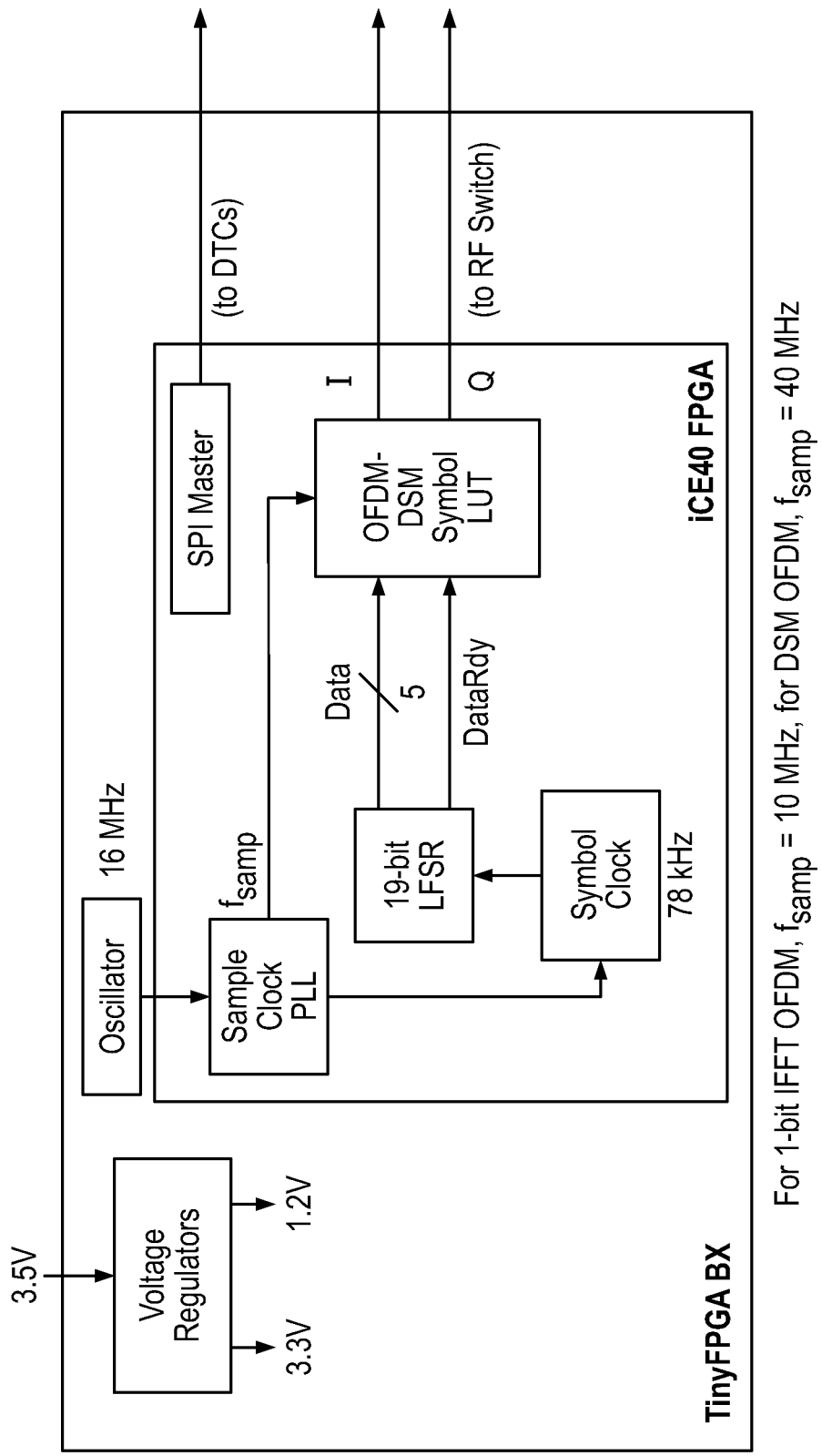
FIG. 10 is a schematic illustration of an FPGA implementation of an IFFT LUT architecture for OFDM backscatter communication arranged in accordance with examples described herein.

FIG. 10 is a schematic illustration of an FPGA implementation of an IFFT LUT architecture for OFDM backscatter communication arranged in accordance with examples described herein. The FPGA of FIG. 10 may be used to implement the IFFT 306 of FIG. 3, for example. In other examples the FPGA of FIG. 10 may be used to implement the look-up table 508 and/or look-up table 510 of FIG. 5. The digital design for an example of the implementation shown in FIG. 10 was written in the Verilog hardware definition language and included a 19-bit linear feedback shift register (LFSR) to generate a pseudo-random data stream, a Symbol Clock generator set to trigger each new symbol at a 250 kHz symbol rate, and an OFDM Symbol LUT. The LUT was generated from 128-point IFFT and contained 64 total symbols each consisting of 128 samples. 32 of the symbols corresponding to the in-phase (I) output and 32 correspond to the quadrature (Q) output. Additionally, a serial peripheral interface (SPI) driver was used to initialize the backscatter modulator's DTCs on power-up.

A custom PCB was designed to interface the backscatter modulator to the FPGA. The backscatter modulator was implemented using a CMOS SP4T RF switch (Analog Devices ADG904) controlled by the FPGA. The RF switch connects one of four impedances to the antenna. The impedances are implemented using two CMOS DTCs (Peregrine Semiconductor PE64101 and PE64909), and two fixed resistor-capacitor pairs. DTCs were used to achieve a reconfigurable inductor-free modulator that facilitates prototyping and design for future application specific integrated circuits (ASICs). The reflection coefficient of each impedance was measured at the reference plane of the antenna connector using a calibrated Agilent N5222A vector network analyzer (VNA). The tuning word for each DTC was iteratively reprogrammed until the reflection coefficients approximated the ideal SSB backscatter constellation in FIG. 9C.

The power consumption of the total OFDM Backscatter FPGA was measured with a precision Keithley power supply. The total power consumption (static+dynamic) of both the FPGA board and backscatter modulator PCB was <33.6 mW from a 3.5 V supply. Of the total power 33.0 mW (98.2%) is due to digital logic in the FPGA, and only 600 μW (1.8%) is consumed by the backscatter modulator.

Within the backscatter modulator PCB, the ADG904 RF switch consumed 200 μW while the DTCs together consumed 400 μW of power.

The OFDM backscatter spectrum was measured. The OFDM backscatter FPGA assembly was connected to the output port of a Mini-Circuits ZABDC20-252H-S+ coupler using a coaxial cable. An Agilent N5181A RF signal generator was connected to the input port of the coupler and configured to generate a pure carrier wave tone at 2.45 GHz and −20 dBm RF power. The output coupled port of the coupler was connected to an Agilent N9320B spectrum analyzer, with attenuation set to 0 dB and a resolution bandwidth of 100 kHz. The input coupled port of the coupler was terminated with a 50μ load. With the signal generator turned on, a pseudo-random sequence of OFDM symbols was generated using the 19-bit LFSR on the FPGA.

A wireless over-the-air measurement was performed to validate that OFDM backscatter symbols can be successfully demodulated. For the measurement, a bi-static backscatter communication setup with 1 meter spacing was used, as depicted in the block diagram and photo of FIGS. 9A and 9B, respectively. The external carrier wave (CW) was generated at 2.45 GHz using an Agilent N5181A RF signal generator with 0 dBm output power, a Mini Circuits ZRL-3500+ RF amplifier with a specified gain of 20 dB, and an L-Com HG72710LP-NF log periodic antenna with a specified gain of 10 dBi. The receiver was implemented using an Ettus Research USRP B210 software-defined radio (SDR), and an L-Com HG72710LP-NF log periodic antenna. The internal clock of the SDR was synchronized to the RF signal generator via a 10 MHz synchronization signal. A desktop PC running GNU Radio Companion ran the SDR and performed down con-version, I/Q balancing, sample and symbol synchronization, and decoding with a sample rate of 20 MSps. The OFDM backscatter FPGA was programmed using the design from FIG. 10 with two modifications: (1) the sample clock PLL frequency was reduced to 5 MHz in order to accommodate the maximum reliable sampling rate of the SDR and PC, and (2) the LFSR was replaced with a sinewave LUT (15-bit amplitude resolution, 128-bit phase resolution) to provide a realistic sensor-data-like payload. The sinewave LUT contained all 32 possible OFDM backscatter symbols and could thus be used to determine whether a receiver could distinguish each unique symbol. The measured over-the-air power spectrum was measured using an Agilent N9320B spectrum analyzer with a resolution bandwidth of 1 kHz, the maximum hold function enabled, and averaging enabled over 10 sweeps. Several seconds of wireless data were captured. Good agreement was observed between the received and original samples, and no bit errors were detected, validating the feasibility of using OFDM backscatter to wirelessly uplink data.

Examples of all-digital architectures for OFDM backscatter modulation are described herein, as well as design analysis, simulations, and measurements for a hardware-efficient IFFT LUT architecture using five subcarriers with BPSK modulation to obtain a throughput of 250 kSymbols/s (1.25 Mbits/s). The hardware implementation uses a low-cost, open-source FPGA platform and a backscatter modulator on a custom PCB. The digital design used 505 logic elements with no multipliers nor any block RAM. Measurements found that the total power consumption of the device was less than 33.6 mW, dominated by FPGA static power consumption, with a backscatter modulator power consumption of only 200 μW, yielding a modulator energy consumption of 160 μJ/bit. RF measurements using a cabled backscatter setup found good agreement between the physical design and simulated backscattered spectrum. Wireless over-the-air measurements validated that data can be successfully recovered without error from the OFDM backscatter symbols.

Simulations of different backscatter modulator configurations were performed to determine the impact of impedance DAC resolution on the backscattered OFDM spectrum. In general, it was found that the highest backscattered subcarrier power is achieved using single sideband backscatter modulation with >2 modulator states and the greatest possible distance between impedance states. As the number of modulator states is increased, the impedance DAC resolution increases and the subcarrier interference ratio (SIR) and sideband rejection ratio (SRR) similarly increase. Interestingly, as the number of modulator states increases from four to sixteen, the average distance between impedance states decreases, decreasing the total backscattered power. This suggests that one should carefully consider the increased cost and power consumption required to implement e.g. a 16-state backscatter modulator for OFDM implementations.

Additionally the OFDM backscatter BER performance was simulated using different fixed-point word resolutions in the IFFT. These simulations revealed that comparable performance (within approximately 1 dB for BER of $10^{-4}$) can be achieved between bit lengths of 4 to 16 bits. This suggests that optimal IFFT architectures can be developed for backscatter radios that could further reduce resource utilization and power consumption.

The designs and analysis provided herein describe low-complexity, low power wireless sensor nodes leveraging OFDM backscatter. Physical and link layer schemes using the architectures presented here may be used. With control of the subcarrier placement and modulation, multi-carrier, multi-protocol backscatter uplinks could be implemented to improve data throughput, multiple access, resilience to interference, and compatibility with custom and off-the-shelf receivers. Additionally, since OFDM backscatter can operate with a low-resolution IFFT, optimizations can be used to further reduce resource utilization and quantify performance in non-ideal channels. Such a low-resource IFFT could greatly expand the applicability of low power, highly configurable OFDM backscatter based wireless sensors.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signals may be provided directly to and/or received directly from the recited components without intervening components, but also may be provided to and/or received from the certain components through intervening components.

What is claimed is:

1. A backscatter device comprising:
    a modulator configured to receive data and provide modulated data comprising one or more symbols;
    a transform configured to convert the modulated data to a sequence of digital values wherein the transform comprises two or more numerically controlled oscillators configured to produce, at least in part, desired frequency components of an orthogonal frequency division multiplexed (OFDM) signal to be transmitted; and at least one switch configured to couple selected impedances to an antenna in accordance with the sequence of digital values to backscatter an incident signal and transmit the data.

2. The backscatter device of claim 1, wherein the at least one switch comprises one digitally-controlled radio frequency (RF) switch.

3. The backscatter device of claim 1, wherein the modulated data comprise multi-tone symbol sequences.

4. The backscatter device of claim 1, wherein the modulated data comprise OFDM signals.

5. The backscatter device of claim 1, wherein the transform comprises an inverse Fourier transform.

6. The backscatter device of claim 5, wherein the transform comprises a pruned or sparse transform.

7. The backscatter device of claim 1, wherein the incident signal comprises a continuous wave signal.

8. The backscatter device of claim 1, wherein the incident signal comprises a modulated signal.

9. The backscatter device of claim 1, wherein the data is formatted in accordance with a Wi-Fi packet format or a Bluetooth packet format.

10. A backscatter device of claim 1, comprising:
a modulator configured to receive data and provide modulated data comprising one or more symbols;
a transform configured to convert the modulated data to a sequence of digital values, wherein the transform comprises one or more look-up tables; and
at least one switch configured to couple selected impedances to an antenna in accordance with the sequence of digital values to backscatter an incident signal and transmit the data.

11. The backscatter device of claim 10, wherein the one or more look-up tables comprise pre-computed time domain sequences indexed by groups of symbols.

12. The backscatter device of claim 11, wherein the one or more look-up tables comprise a sparse group of the pre-computed time domain sequences indexed by the groups of symbols, and wherein a count of the time domain sequences is less than a count of possible groups of symbols.

13. A backscatter device comprising:
a modulator configured to receive data and provide modulated data comprising one or more symbols;
a transform configured to convert the modulated data to a sequence of digital values;
at least one switch configured to couple selected impedances to an antenna in accordance with the sequence of digital values to backscatter an incident signal and transmit the data; and
wherein the sequence of digital values is conveyed to the at least one switch via a delta-sigma modulator, a sigma-delta modulator, or another pulse-density modulator.

14. The backscatter device of claim 13, wherein an output signal of the delta-sigma modulator, the sigma-delta modulator, or the pulse-density modulator is filtered by an analog filter.

15. The backscatter device of claim 14, wherein the analog filter comprises a low-pass filter.

16. The backscatter device of claim 13, wherein an output spectrum of the pulse-density modulator comprises frequency components that comprise, at least in part, desired frequency components of an orthogonal frequency division multiplexed (OFDM) signal to be transmitted.

17. A method comprising:
modulate input data to provide modulated data;
transform the modulated data to a sequence of digital values, wherein said transform comprises using one or more look-up tables; and
couple selected impedances to an antenna using a switch controlled by the sequence of digital values to backscatter an incident signal and transmit the data.

18. The method of claim 17, wherein the modulated data comprise orthogonal frequency division multiplexed (OFDM) signals.

19. The method of claim 17, wherein said transform comprises using an inverse Fourier transform.

20. The method of claim 17, wherein said controlling of the switch by the sequence of digital values comprises using a delta-sigma modulator, a sigma-delta modulator, or another pulse-density modulator.

* * * * *